US012659331B2

(12) United States Patent    (10) Patent No.:   US 12,659,331 B2
Duan et al.      (45) Date of Patent:    Jun. 16, 2026

(54) REAL-TIME ATTRIBUTION OF TOOLS AND CAMPAIGNS FOR DNS TUNNELING TRAFFIC

(71) Applicant: Palo Alto Networks, Inc., Santa Clara, CA (US)

(72) Inventors: Ruian Duan, Santa Clara, CA (US); Daiping Liu, Sunnyvale, CA (US); Zihang Xiao, Los Gatos, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 155 days.

(21) Appl. No.: 18/538,945

(22) Filed: Dec. 13, 2023

(65) Prior Publication Data

US 2025/0202916 A1    Jun. 19, 2025

(51) Int. Cl.
*H04L 9/40*      (2022.01)

(52) U.S. Cl.
CPC ...... *H04L 63/1425* (2013.01); *H04L 63/1416* (2013.01); *H04L 63/145* (2013.01)

(58) Field of Classification Search
CPC .......................... H04L 63/1416; H04L 63/145
See application file for complete search history.

(56) References Cited

U.S. PATENT DOCUMENTS

| | | | |
|---|---|---|---|
| 7,188,191 B1* | 3/2007 | Hovell | H04L 61/251 |
| | | | 709/230 |
| 2016/0127395 A1* | 5/2016 | Underwood | G06F 21/556 |
| | | | 726/23 |
| 2018/0063162 A1* | 3/2018 | Baughman | H04L 63/1416 |
| 2021/0126901 A1* | 4/2021 | Rodriguez | G06N 20/20 |
| 2021/0266293 A1* | 8/2021 | Liu | H04L 61/5007 |
| 2022/0210170 A1* | 6/2022 | Di Pinto | H04L 63/1416 |
| 2022/0407870 A1* | 12/2022 | Vega | H04L 61/4511 |
| 2023/0056625 A1* | 2/2023 | Afonin | H04L 63/0236 |
| 2024/0220613 A1* | 7/2024 | Israel | G06F 21/554 |
| 2024/0311479 A1* | 9/2024 | Yan | G06F 21/53 |

OTHER PUBLICATIONS

Mishuhashi et al., Malicious DNS Tunnel Tool Recognition Using Persistent DoH Traffic Analysis, Jun. 2023 (Year: 2023).*
Wu et al., FTPB: A Three-stage DNS Tunnel Detection Method Based on Character Feature Extraction, 2020 (Year: 2020).*
Luo et al., Towards Comprehensive Detection of DNS Tunnels, 2020 (Year: 2020).*
Liang et al., FECC: DNS tunnel detection model based on CNN and clustering, Feb. 2023 (Year: 2023).*

* cited by examiner

*Primary Examiner* — Hieu T Hoang
(74) *Attorney, Agent, or Firm* — Van Pelt, Yi & James LLP

(57) ABSTRACT

Various embodiments provide a system, method, and device for applying a DNS activity classification framework. The method incudes (i) collecting DNS-related activity, (ii) determining whether the DNS-related activity is associated with a DNS tunneling campaign or tool, and (iii) performing an active measure in response to detecting DNS traffic associated with a tunneling domain.

24 Claims, 13 Drawing Sheets

500

300

400

500

700

Start

Obtain indication to perform labelling of DNS-related activity for a traffic sample — 805

Obtain labeled tunneling domains — 810

Perform a data collection for the traffic sample — 815

Determine one or more features for the traffic sample — 820

Perform a label lookup — 825

Provide an indication of a result of the attribution of DNS-related activity — 830

Done? — 835

No

Yes

End

800

900

1000

<u>1200</u>

1300

REAL-TIME ATTRIBUTION OF TOOLS AND CAMPAIGNS FOR DNS TUNNELING TRAFFIC

BACKGROUND OF THE INVENTION

DNS is a fundamental protocol used for translating human-readable domain names into IP addresses. It plays a critical role in the functioning of the internet. However, malicious actors have increasingly exploited DNS to bypass security measures and exfiltrate data, control compromised systems, or establish covert communication channels. This technique is known as DNS tunneling.

DNS tunneling typically involves embedding data or commands within DNS queries or responses, effectively using DNS as a transport mechanism. This makes it challenging for traditional network security tools to detect and mitigate such malicious activities. Moreover, attackers often employ various evasion techniques, such as domain generation algorithms (DGAs) and encryption, to further obfuscate their actions.

Existing solutions for identifying DNS tunneling traffic primarily focus on detecting anomalies in DNS traffic patterns, which can lead to false positives or fail to attribute these activities to specific tools or campaigns. Accurate attribution of DNS tunneling activities to their sources, tools, or campaigns is crucial for effective threat mitigation and incident response.

BRIEF DESCRIPTION OF THE DRAWINGS

Various embodiments of the invention are disclosed in the following detailed description and the accompanying drawings.

DETAILED DESCRIPTION

Figure 1:
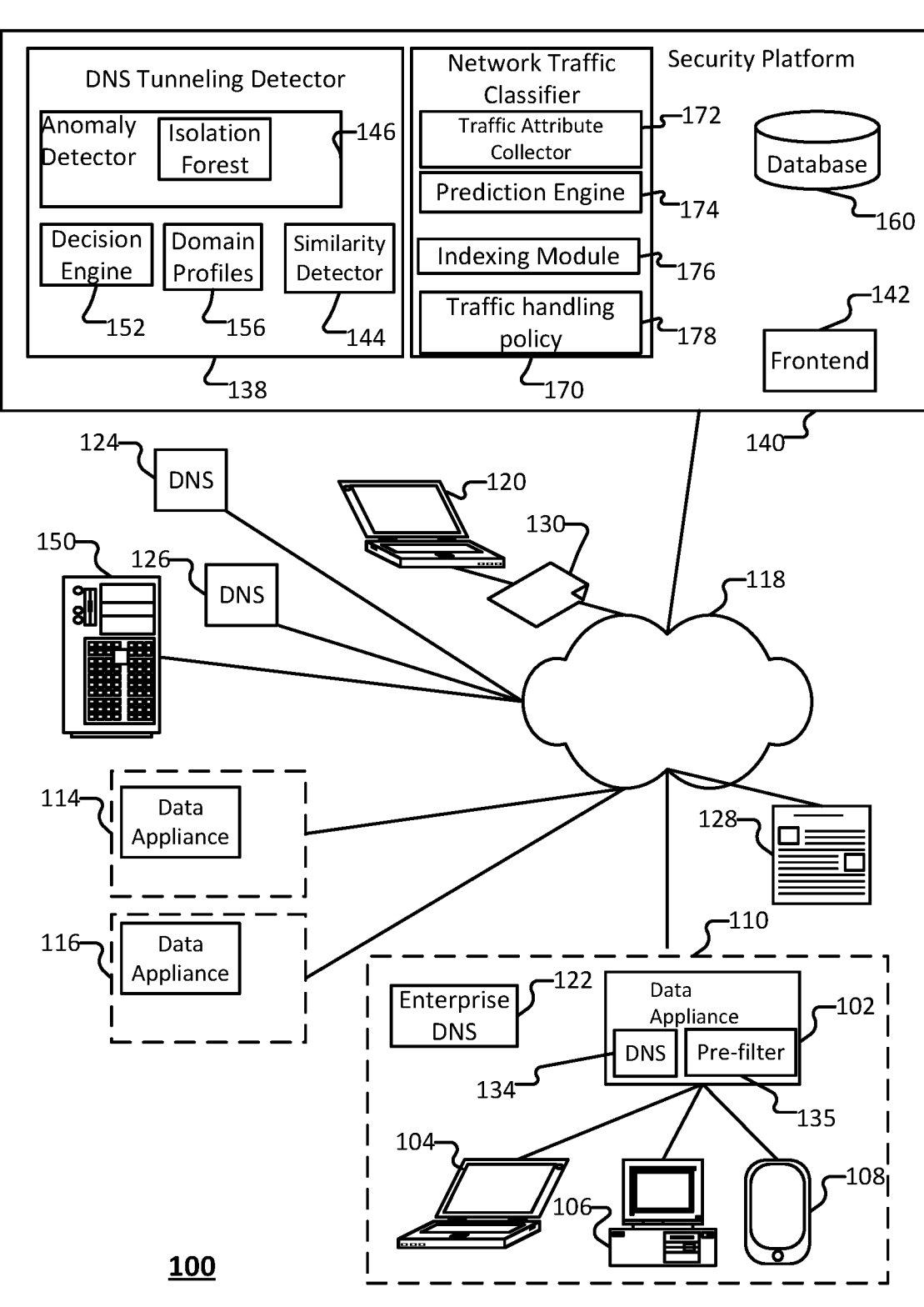
FIG. 1 is a block diagram of an environment for detecting malicious traffic and attributing malicious traffic to a DNS tunneling campaign or tool according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments provide a system, method, and device for applying a DNS activity classification framework. The method incudes (i) collecting DNS-related activity, (ii) determining whether the DNS-related activity is associated with a DNS tunneling campaign or tool, and (iii) performing an active measure in response to detecting DNS traffic associated with a tunneling domain.

Related art systems generally perform a detection of whether network traffic is malicious or benign. Such related art systems do not determine a severity of an incident/action, and thus do not determine an urgency with which the incident is to be addressed by a remedial action/active measure. Various embodiments determine an attribution of DNS activity to a particular known DNS tunneling campaign or tool, such as based at least in part on obtaining DNS-activity information, computing features for the DNS-activity information, and matching the features against an index for known campaigns or tools. The system can further determine whether the network traffic does not match a known campaign or tool, and can perform further monitoring to determine whether new campaigns or tools emerge based on features for such unmatched network traffic satisfying a set of one or more predefined rules or a new cluster of a type of network traffic being identified based on performing a clustering technique with respect to features for various network traffic samples.

The attribution of network traffic to a particular DNS tunneling tool or campaign enables the system to assess the severity of the network traffic (e.g., a severity of detected DNS tunneling based on a predefined policy) and to handle the network traffic according to the severity. For example, the system may deem C2 traffic to be more severe than use of a VPN service to circumvent firewall restrictions. As such, the system may determine to more urgently remediate the C2 traffic (e.g., to identify infected client systems, quarantine network traffic, etc.) than mere use of a VPN service in contravention of network policies.

C2 is the well-known use case for DNS tunneling. The same campaign may share characteristics such as common nameservers as C2 for communication, or a common tunneling tool for encoding and decoding. Several campaigns identified by network security services, or a community service are described below.

A first campaign, referred to herein as FinCounter, is configured to target an organization/network from the financial industry. For this campaign, twenty-two tunneling domains have been observed to be used for targeting a particular organization/network. Analyzing the 22 tunneling domains indicates that the domains share nameserver IPs and use the same underlying encoding tool. The attackers also try to use domain names that imitate popular security or cloud providers, in the hope of evading detection. A subset of the domains is: panos[.]ltd, ciscocloud[.]space, ubrella[.]online, msft[.]center, mscd[.]store, awsl[.]site. These domains, together with their sample queries, nameserver domains, nameserver IPs are listed below in Table 1. The FinCounter campaign targets an organization/network in the financial industry and uses the same underlying encoding tool, whose queries start with a counter.

TABLE 1

A subset of the domains used in the FinCounter campaign

| Domain | Sample Query | Nameserver Domain | Nameserver IP |
|---|---|---|---|
| panos.ltd | 10.eff89fcf44a13186ad3765f35860ce19c722c4bc da6bbbae6b7bab6025b36d0.d036b5a3fd8b67e5 5ee35feff7d014fdb8d32afe93d5d6f05f1dda3a096 e8fa.2e10d53e935549b3a081982724c3e6f806.oa k.panos.ltd | bur.panos.ltd | 34.92.43.140 |
| ciscocloud.space | 10.a6674ae5d37cab7263074adef14925ef286988 96b8491276097a470beca325a.669f12d4b31e9a6 707ce2ee5b595cb723f40ea6d8e5f406b8fba874c 8bec632.3299de58f43c3e4be80a7d7db2a2ed5ae e9e13bac9cb.habit.ciscocloud.space | bram.ciscocloud.space | 34.92.43.140 |
| ubrella.online | 8.d4fee8aa63e4ee6435452f86e84464168e96e31 4eb1a19c45e0e76f3ca71b2a.e9476062765ba0ae aeea97333805f09470ff3bd103e3ce8bd3ffefa3dfe a90f.369cd352a204e9662db180407f1d1b8fa87b e97c81d1.feign.ubrella.online | rumor.ubrella.online | 34.92.43.140 |
| mscd.store | 4.a6gpmbnqbjewgwnqnlivwhleux4vnnyiuduyqgjk yn9jcihsttpdbdenf7lx8jx.jqhdulrejthsyipzvoleyvhv5 s99nydtj5um8bzdmdms9gwdqnq46yis5hvbryo.de rnuvjw7a6p6ndq4c8lwomsl7zq5lncgsutndxfpaufe fhr7xxeuhfpk8hs.sny7htmpdpqdcumtgrmeptytbe 9p78skry64.17328.fish.mscd.store | rug.mscd.store | 35.194.255.111 |
| awsl.site | 1.758fcd0ac2301084ef82efb047050ff5e7d45b4cd 636b46e4292b67acac5ab0.a1644dfde400b8d41e 7b6ec37338c45d34a8e9ed81173e8dffdf57ebb3c 9e30.9fc12877d608dfca610d50a121acbd30b245 0391c13a.mud.awsl.site | lkas.awsl.site | 35.194.255.111 |
| msft.center | 10.c5f310abb43603a3af324ee92bea16c8132ec2 909fbca8d1036fe409d33af9b.c8c30e936bffb9f93 bcba2c27682dcca1ab79aced6d1cf015a11d56a9 c2f9f5.c49d8757a19b693d78d1772977cbf164e2 748b57bb9f.ud.msft.center | 08e099da.msft.center | 34.81.65.4 |

A second campaign, referred to herein as FinSupport, is configured to target an organization/network from the financial industry. For this campaign, three tunneling domains have been observed to be used for targeting a particular organization/network, and use the same underlying tunneling tool (e.g., Cobalt Strike). A representative characteristic of the Cobalt Strike tool is the use of common prefixes such as www, post, api, etc. Table 2 provides the three domains (e.g., identity-mgmt[.]com, internalsupport[.]info, cloud-enrollment[.]com), corresponding sample queries, nameserver domains, and nameservers IPs in Table 2. The FinSupport tool enables the attackers to try to evade detection by adopting domain names that imitate supporting services.

TABLE 2

| | | Nameserver | Nameserver |
|---|---|---|---|
| | Example list of domains used in the FinSupport campaign | | |
| Domain | Sample Query | Domain | IP |
| cloud-enrollment.com | api.12abc2cb5.446f35fa.dns.cloud-enrollment.com | ns1.cloud-enrollment.com | 3.238.113.212 |
| identity-mgmt.com | intact.md.180.02d8f18d2.7e8986be.int.identity-mgmt.com | ns1.cloud-enrollment.com | 3.238.113.212 |
| internalsupport.info | icr.0325e18d8.16ae9fb2.pl.internalsupport.info | dn.internalsupport.info | 3.238.244.129 |

A third campaign is the publicly reported DecoyDog campaign by Infoblox in April 2023. The DecoyDog exploit domains share the same underlying tunneling tool Pupy, which uses the character "9" as padding while encoding data. Additionally, the attackers reuse nameserver IPs to reduce cost (e.g., allowlisted[.]net and rcsmf100[.]net). Table 3 provides a subset of the domains used in the DecoyDog campaign, corresponding sample queries, nameserver domains, and nameserver IPs.

TABLE 3

| | | Nameserver | Nameserver |
|---|---|---|---|
| | Example list of domains used in the DecoyDog campaign | | |
| Domain | Sample Query | Domain | IP |
| claudfront.net | fstz1yibfqnaw6mxpen3nknghh2q9999.1112u mplhvbbzf2udr2rpuq9.claudfront.net | ns1.claudfront.net, ns2.claudfront.net | 5.252.176.63 |
| allowlisted.net | hs1t4lt2lb2ispy5ho4vmr5okvua9999.111b52v 2e3ktuuyrn6j4xrq9.allowlisted.net | ns1.allowlisted.net, ns2.allowlisted.net | 83.166.240.52, 5.252.176.22 |
| hsdps.cc | gc2qagfacoq1zutfr61dko5mdjqa9999.1111su hsamuohkj404wn5qa9.hsdps.cc | ns1.hsdps.ns1.name, ns2.hsdps.ns1.name | 194.31.55.85 |

Virtual Private Network (VPN) services are potential use case for DNS tunneling. For example, VPN can be used by enterprise employees to bypass an organization's network firewall's restrictions on using VPN service, or by vehicle passengers to bypass network service charge (e.g., to gain free Internet access on a cruise ship). The same service or tool shares characteristics such as a common nameserver for communication, or a common tunneling tool for encoding and decoding. Two popular VPN services and a tunneling tool adopted by multiple VPN services are provided below.

Astrill VPN is a VPN service that tunnels traffic using IPV6 (AAAA) queries and responses and uses a corpus of forty-nine tunneling domains to avoid being blocked. The domains used by the VPN service are registered under different TLDs, including com, net, pw, tech, top, space etc. However, the domains all share the same nameserver IPs: 209.133.209[.]197 and 104.156.49[.]110, which is also pointed to by in01/in02.astrill[.]com, the official page of the Astrill VPN. Table 4 provides a subset of the domains used by Astrill VPN, corresponding sample records, nameserver domains, and the nameserver IPs. Analysis of network traffic using a security entity/service (e.g., a firewall, etc.) has shown that a relatively large amount of tunneling traffic from Astrill VPN. Accordingly, Astrill VPN has been widely adopted and enterprise employees potentially abuse the Astrill VPN service to bypass the enterprise firewall restrictions on using a VPN service. However, real intentions of users that deploy Astrill VPN may vary from unawareness of the underlying technology to actively adoption DNS tunneling based VPN service, and can only be identified and handled on a per case basis.

TABLE 4

| | | | |
|---|---|---|---|
| Example list of domains used by the Astrill VPN tool | | | |
| Domain | Sample Query | Nameserver Domain | Nameserver IP |
| nanogardens.tech | 0g87sbvrbb8f79ee.s2bbv747ck53wp7k.s. nanogardens.tech AAAA 1327:fb85:793c:bda6:d571:841f:b240:1cb2 | s01.nanogardens.tech, s02.nanogardens.tech | 209.133.209.197, 104.156.49.110 |
| openair.pw | nq482xfw1zyq0vg5.ehadgy6qeq015w47.s .openair.pw AAAA aca9:8998:5018:1b61:fa26:b64f:77fb:a325 | s01.openair.pw, s02.openair.pw | 209.133.209.197, 104.156.49.110 |
| radiantsands.com | nq482xfw1zyq0vg5.ehadgy6qeq015w47.s .radiantsands.com AAAA a646:622:d647:539b:a780:21c9:eabe:1162 | s01.radiantsands.com, s02.radiantsands.com | 209.133.209.197, 104.156.49.110 |

HA Tunnel Plus is a VPN service that tunnels traffic using TXT queries and responses and uses only one tunneling domain hat53[.]com. Tunneling traffic under this domain is frequently observed by a networks security service providing security and network analysis of various enterprise networks, including cruise lines, thereby indicating that vehicle passengers are using such VPN services to bypass network service charge. An example a sample TXT tunneling record is: t3f43builrjoxy5olfgijiryoi3vcabaabtq4byag2cqaad 3emaaaaaaaacsnn.5rhm62glydte5esgax5p57d wyygwf nszyvpc4s2euahvqeceqb6crq64lbq5fr6.41wcok3fmo u2bobxyv2v27u67oez35kt5suc7eek26ykoob 32vizs wowherp2vj.bv2cnzu3luktz7aplh2whj63kmd2tb5ks e4rky3ag4r.ns-cal.hat53.com TXT \\000\\024\\ 1628r7r\\000@\\000\\140\\014\\007\\0009\\133\\000\\ 000u\\133\\000\\000\\000\\000\\000\\000.

To optimize its performance, HA Tunnel Plus uses multiple nameservers to serve tunneling traffic from different regions. For example, tunneling queries that are subdomains of ns-cal.hat53[.]com is redirected to a Canadian nameserver a-cal.hat53[.]com with IP 138.197.156[.]58; tunneling queries that are subdomains of ns-del.hat53[.]com are redirected to a Germany nameserver a-del.hat53.com with IP 104.248.27[.]88. Table 5 provides examples of various sample service countries of the HA Tunnel Plus tool.

TABLE 5

| | | | |
|---|---|---|---|
| An example of a subset of the service countries of HA Tunnel Plus tool | | | |
| Service Country | Subdomain | Nameserver Domain | Nameserver IP |
| Canada | ns-cal.hat53.com | a-cal.hat53.com | 138.197.156.58 |
| Germany | ns-del.hat53.com | a-del.hat53.com | 104.248.27.88 |
| Singapore | ns-sg1.hat53.com | a-sg1.hat53.com | 159.223.37.124 |
| United States | ns-us1.hat53.com | a-us1.hat53.com | 147.182.186.204 |

Although VPN services can be individually identified and verified, various services have been determined to use the same underlying tunneling encoding and decoding tool. An example is dnstt, an open-source DNS tunneling tool used by several VPN services, such as MinaProNet VPN, Edoz-tunnel VPN, and TunnelCat VPN. dnstt implements a protocol on top of DNS queries and responses and has security features such as encryption and authentication. dnstt uses TXT record exclusively to encode data into DNS responses. In addition to the standard UDP, dnstt can also use DoH (DNS-over-HTTPS) and DoT (DNS-over-TLS) to provide privacy and evade detection. A DNS security service can identify DoH and DoT resolvers and use the Decryption feature to decrypt the payloads, allowing DNS tunneling detection to work seamlessly. Table 6 includes example VPN services using the dnstt tool and their sample domain setups. Similar to the HA Tunnel Plus, the listed services use multiple nameservers to serve tunneling traffic from different regions to optimize performance.

TABLE 6

| | | | | |
|---|---|---|---|---|
| Example VPN services using the dnstt tool | | | | |
| VPN Service | Sample Domain | Sample Record | Nameserver Domains | Nameserver IPs |
| MinaProNet VPN | minapronetvpn.com | 6rpaviehgxyvpyy4ocbbxkiyv2zvcacaad4iw 3qaxa3acahhuyaaaayaaaabo3z.2.dnstt-ser ver.minapronetvpn.com TXT | nl-server.minapronetvpn.com | 146.190.20.243 |

TABLE 6-continued

| | | Example VPN services using the dnstt tool | | |
| --- | --- | --- | --- | --- |
| VPN Service | Sample Domain | Sample Record | Nameserver Domains | Nameserver IPs |
| | | \\000\\024\\169\\024\\174\\179r\\000@\\000 \\248\\139n\\000\\1866\\001\\000\\1846\\ 001\\000\\000\\000\\000\\000 ajph3r4dpholdyywl7fbxrsv4cofcacaab62iay aeynqaac2e4aaaayaaaahx6a.2.dnstt2-serv er.minapronetvpn.com TXT \\000\\024\\198u\\224\\156r\\000@\\000u\\ 164\\003\\000\\022\\027\\000\\000\\020\\027 \\000\\000\\000\\000\\000\\000 | ws2-server.minapronetvpn.com | 104.248.142.17 |
| Edoztunnel VPN | dozapp.xyz | khvsoyur5pwo5yyz6wzeikuydeivcacaabgxi aaa74bqaad4amaaalaaaaagi4s.idfsuez5dm ik2iuoywuf57fozubc2vw2e7jd4ioufzyvaumn huceo5gznotvueq.ez4u.newca.dozapp.xyz TXT \\000\\024*\\152\\025\\017r\\000@\\000dt\\ 000\\000\\251\\003\\000\\000\\253\\003\\ 000\\000\\000\\000\\000\\000 | newcan.dozapp.xyz | 144.217.81.86 |
| | | 2no7jtyrhvomd2b6qdao4fkdb7ra.dnsau.do zapp.xyz TXT \\000\\024\\017a\\163\\209r\\000@\\0000\\ 005\\000\\000\\000\\000\\000\\000\\000\\ 002\\000\\000\\000\\000\\000\\000\\000 | au.dozapp.xyz | 104.21.69.17 |
| TunnelCat VPN | tcat.site | n6s7qzzxy43m5y6qu6tibfphtc3vcabaacvfs aia2ibqaabcaaaaa2aaaaaoimg.e2w6epiijkq s73eyxui3w4vxxpvemn5zy5ikh5med7gisk3 5c6lnwgjjcoquoer.igvoe2ysqytgj4jfonfbktey rkowecqtkoskugqgomq56vxvpsmmdm4j4f k2tuo.223tigunynencz4ak674315z7jyyrxgaz v7m4.dns.de3-dnstt.tcat.site TXT \\000\\024\\149\\231\\152\\183r\\000@\\ 000\169y\\001\000\\208\\003\\000\\000\\209 \\003\\000\\000\\000\\000\\000\\000 | de3-dnstt.tcat.site | 64.225.106.232 |
| | | hknjypabcykw3yznc4sb7ehanbufcabaactv saaatebaaaheaaaaabyaaaaoo4n.22vtyimy. dnstt-fast-de.t3.67.83.152 dns.dnstt-fast-de.tcat.site TXT \\000\\024\\144\\224hhr\\000@\\000\\167y \\000\\000\\152\\002\\000\\000\\153\\002\\ 000\\000\\000\\000\\000\\000 | dnstt-fast-de.tcat.site | 3.67.83.152 |

FIG. 1 is a block diagram of an environment for detecting malicious traffic and attributing malicious traffic to a DNS tunneling campaign or tool according to various embodiments. In various embodiments, system 100 is implemented in connection with system 200 FIG. 2 and/or system 400 of FIG. 4. In various embodiments, system 100 is implemented in connection with process 800 of FIG. 8, process 900 of FIG. 9, process 1000 of FIG. 10, process 1100 of FIG. 11, process 1200 of FIG. 12, and/or process 1300 of FIG. 13.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy, a network traffic handling policy, etc.) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies (or other traffic monitoring policies) that selectively block traffic, such as traffic to malicious domains or parked domains, or such as traffic for certain applications (e.g., SaaS applications). In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with remote security platform 140. Security platform 140 can provide a variety of services, including determining an attribution of network traffic to a particular DNS tunneling campaign or tool, indexing features or other DNS-activity information with respect to particular campaigns or tools (or as unknown), classifying network traffic (e.g., identifying application(s) to which particular samples of network traffic corresponding, determining whether traffic is malicious, detecting malicious traffic, detecting C2 traffic, etc.), providing a mapping of signatures to certain traffic (e.g., a type of C2 traffic,) or a mapping of signatures to applications/application identifiers (e.g., network traffic signatures to application identifiers), providing a mapping of IP addresses to certain traffic (e.g., traffic to/from a client device for which C2 traffic has been detected, or for which security platform 140 identifies as being benign), performing static and dynamic analysis on malware samples, assessing maliciousness of domains, determining whether domains are parked domains, providing a list of signatures of known exploits (e.g., malicious input strings, malicious files, malicious domains, etc.) to data appliances, such as data appliance 102 as part of a subscription, detecting exploits such as malicious input strings, malicious files, or malicious domains (e.g., an on-demand detection, or periodical-based updates to a mapping of domains to indications of whether the domains are malicious or benign), providing a likelihood that a domain is malicious (e.g., a parked domain) or benign (e.g., an unparked domain), providing/updating a whitelist of input strings, files, or domains deemed to be benign, providing/updating input strings, files, or domains deemed to be malicious, identifying malicious input strings, detecting malicious input strings, detecting malicious files, predicting whether input strings, files, or domains are malicious, and providing an indication that an input string, file, or domain is malicious (or benign).

In various embodiments, results of analysis (and additional information pertaining to applications, domains, etc.), such as an analysis or classification performed by security platform 140, are stored in database 160. For example, database 160 stores an index of labeled data, such as a mapping of computed features based on DNS-activity information to corresponding DNS tunneling campaigns/tools. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remainder portions of security platform 140 provided by dedicated hardware owned by and under the control of the operator of security platform 140.

In some embodiments, network traffic classifier 170 detects/classifies network traffic or otherwise attributes the network traffic to a particular DNS tunneling campaign or tool. For example, the network traffic classifier determines the application (e.g., an application identifier) to which a sample of network traffic corresponds. In some embodiments, network traffic classifier 170 classifies the sample based at least in part on a signature of the sample, such as by querying a mapping of signatures to applications/application identifiers (e.g., a set of previously analyzed/classified applications). In some embodiments, network traffic classifier 170 determines an attribution of the sample based at least in part on DNS-activity information (e.g., features computed from the DNS-activity information). In some embodiments, network traffic classifier 170 classifies the sample based on a predicted traffic classification (e.g., a prediction of whether traffic is C2 traffic, or whether sampled traffic is malicious traffic, etc.) or a predicted attribution to a DNS tunneling campaign or tool. For example, network traffic classifier 170 determines (e.g., predicts) the traffic classification based at least in part on header information for the traffic.

Network traffic classifier 170 includes a classifier or model (e.g., prediction engine 174) that is trained to detect malicious traffic. Additionally, or alternatively, network traffic classifier 170 comprises a classifier or model (e.g., prediction engine 174) that is trained to perform an attribution of the network traffic to a particular DNS tunneling campaign or tool.

In response to determining a predicted classification for a sample (e.g., a traffic sample), network traffic classifier 170 may determine a signature for the sample and store in a mapping of signatures to traffic classifications (e.g., an indication of whether the sample is malicious or benign/non-malicious) the sample signature in association with the predicted classification. For example, the signature and/or the predicted classification for a sample may be stored in database 160. In some embodiments, in response to determining a predicted classification for a sample (e.g., a traffic sample), network traffic classifier 170 may store an association between the IP address for network traffic and an indication of whether the traffic is malicious or benign/non-malicious. For example, network traffic classifier 170 identifies an IP address to/from which malicious traffic is being communicated (e.g., an IP address for the client device corresponding to a beacon in the C2 framework).

In response to determining an attribution of the sample to a particular DNS tunneling campaign or tool, or an unknown campaign or tool (e.g., a campaign/tool that is not yet identified), network traffic classifier 170 can store/update an index of labeled data stored in database 160.

In some embodiments, system 100 (e.g., network traffic classifier 170, security platform 140, etc.) trains a classifier (e.g., a model) to detect (e.g., predict) traffic for applications. For example, system 100 trains a classifier to perform traffic classification (e.g., to classify traffic as malicious or benign/non-malicious).

In some embodiments, such as for performing a traffic classification as benign or malicious, the classifier is trained based at least in part on a machine learning process. Examples of machine learning processes that can be implemented in connection with training the classifier(s) include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN)

clustering, principal component analysis, a convolutional neural network (CNN), etc. In some embodiments, network traffic classifier 170 implements a CNN model.

System 100 (e.g., network traffic classifier 170, security platform 140, etc.) performs feature extraction with respect to the sample traffic, such as performing embedding extraction on header information for the sample traffic. In some embodiments, system 100 (e.g., network traffic classifier 170) generates a set of embeddings or features for training a machine learning model for classifying the traffic (e.g., classifying whether the traffic is malicious/non-malicious). System 100 then uses the set of embeddings or features to train a machine learning model (e.g., a CNN model) such as based on training data that includes benign samples of network traffic and malicious samples of network traffic.

According to various embodiments, security platform 140 comprises DNS tunneling detector 138 and/or network traffic classifier 170. Security platform 140 may include various other services/modules, such as a malicious sample detector, a parked domain detector, an application classifier or other traffic classifier, etc. In response to receiving an indication that an assessment of a sample of network traffic (e.g., C2 type classification, determine whether the malicious/benign, etc.) is to be performed, network traffic classifier 170 analyzes the sample to determine the assessment of the network traffic (e.g., C2 traffic classification, determine whether the sample is malicious or benign/non-malicious, etc.) and/or an attribution of the network traffic (e.g., detection that the network traffic corresponds to a particular DNS tunneling campaign or tool).

In some embodiments, network traffic classifier 170 comprises one or more of traffic attribute collector 172, prediction engine 174, indexing model 176, and/or traffic handling policy 178.

Traffic attribute collector 172 is used in connection with determining a header for network traffic (e.g., the traffic sample being analyzed). Traffic attribute collector 172 extracts header information from the sample. Additionally, or alternatively, in response to determining to perform an attribution of the network traffic, traffic attribute collector 172 obtains header information from the sample and obtains corresponding DNS-activity information, such as traffic information, infrastructural information, and/or auxiliary information.

Network traffic classifier 170 determines embeddings associated with the sample being analyzed. For example, prediction engine 174 determines embeddings for the header information comprised in the sample and/or for DNS-activity information for the sample.

In some embodiments, prediction engine 174 is used in connection with predicting a classification for the sample, detecting malicious traffic, or otherwise predicting whether the corresponding traffic is malicious/non-malicious. Prediction engine 174 may detect C2 traffic or malicious traffic (e.g., predict whether the traffic is malicious/non-malicious) based at least in part on the embeddings or features for the sample (e.g., the header embeddings or the embeddings or features for the DNS-activity information). In some embodiments, prediction engine 174 uses a machine learning process to analyze the sample/detect whether the traffic is malicious traffic. As an example, the machine learning process includes use of a CNN. Using the machine learning process to analyze the sample and/or detect malicious traffic may include querying a classifier (e.g., a model).

In some embodiments, prediction engine 174 is used in connection with determining an attribution of network traffic to a known DNS tunneling campaign or tool, or to determine that the network traffic does not match a known campaign or tool. Prediction engine 174 may determine the attribution based at least in part on performing a look-up against labeled data based at least in part on computed features for the DNS-activity information (e.g., lexical features, statistical features, infrastructural features, and/or auxiliary features). The labeled data may be stored in an index in database 160.

The computed features for DNS-activity information may be defined by a subject matter expert, or determined based at least in part on performing a machine learning process to identify features that can be used to determine attribution of network traffic.

According to various embodiments, in response to prediction engine 174 classifying the sample or determining an attribution to a DNS tunneling campaign or tool, system 100 handles the sample or traffic matching the sample (e.g., a traffic having a signature the same as the sample, traffic originating from the same IP address as the sample, etc.) according to a predefined policy. For example, the system queries traffic handling policy 178 to determine the manner by which traffic matching the sample is to be handled. Traffic handling policy 178 may be a predefined policy, such as a security policy, etc. Traffic handling policy 178 may indicate that traffic for certain applications is to be blocked and traffic for other applications is to be permitted to pass through the system (e.g., routed normally). Traffic handling policy 178 may correspond to a repository of a set of policies to be enforced with respect to network traffic. In some embodiments, security platform 140 receives one or more policies, such as from an administrator or third-party service, and provides the one or more policies to various network nodes, such as endpoints, security entities (e.g., inline firewalls), etc.

In response to determining a classification for a newly analyzed sample, security platform 140 (e.g., network traffic classifier 170) sends an indication that traffic matching the sample is associated with, or otherwise corresponds to, the determined classification. In the case that the determined classification is malicious traffic, security platform 140 provides an indication that traffic matching the sample (e.g., the same sample signature or same originating IP address, etc.) is also deemed malicious traffic. For example, security platform 140 computes a signature for the sample (e.g., a hash or other signature), and sends to a network node (e.g., a security entity, an endpoint such as a client device, etc.) an indication of the classification associated with the signature (e.g., an indication whether the traffic is malicious traffic, or an indication whether the traffic is malicious/non-malicious traffic). Security platform 140 may update a mapping of signatures to traffic classifications and provide the updated mapping to the security entity. In some embodiments, security platform 140 further provides to the network node (e.g., security entity, client device, etc.) an indication of a manner in which traffic matching the signature is to be handled. For example, security platform 140 provides to the security entity a traffic handling policy, a security policy, or an update to a policy.

In some embodiments, system 100 (e.g., prediction engine 174 of network traffic classifier, an inline firewall or other inline security entity, etc.) determines whether information pertaining to a particular sample (e.g., a newly received sample to be analyzed) is comprised in a dataset of historical samples (e.g., historical network traffic), whether a particular signature is associated with malicious traffic, whether the signature can be attributed to a particular DNS tunneling campaign or tool, or whether traffic corresponding to the sample to be otherwise handled in a manner different than the normal traffic handling. The historical information may be provided by a third-party service such as VirusTotal™. In response to determining that information pertaining to a sample is not comprised in, or available in, the dataset of historical samples, system 100 (e.g., network traffic classifier 170 or other inline security entity) may deem that the sample/traffic has not yet been analyzed and system 100 can invoke an analysis (e.g., a sample analysis) of the sample in connection with determining (e.g., predicting) the traffic classification (e.g., an inline security entity can query a classifier, such as network traffic classifier 170 that uses the header information for the sample to query a machine learning model). The historical information (e.g., from a third-party service, a community-based score, etc.) indicates whether other vendors or cyber security organizations deem the particular traffic as malicious or should be handled in a certain manner.

Returning to FIG. 1, suppose that a malicious individual (using client device 120) has created malware or malicious sample 130, such as a file, an input string, etc. The malicious individual hopes that a client device, such as client device 104, will execute a copy of malware or other exploit (e.g., malware or malicious sample 130), compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as C2 server 150, as well as to receive instructions from C2 server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C2 server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C2 server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C2 server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier that implements a pre-filter model, such as in connection with detecting malicious or suspicious samples, detecting parked domains, or otherwise determining that certain detected network traffic is to be further analyzed (e.g., using a finer detection model).

In various embodiments, when a client device (e.g., client device 104) attempts to resolve an SQL statement or SQL command, or other command injection string, data appliance 102 uses the corresponding sample (e.g., an input string) as a query to security platform 140. This query can be performed concurrently with the resolution of the SQL statement, SQL command, or other command injection string. As one example, data appliance 102 can send a query (e.g., in the JSON format) to a frontend 142 of security platform 140 via a REST API. Using processing described in more detail below, security platform 140 will determine whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. In other implementations, an inline security entity queries a mapping of hashes/signatures to traffic classifications (e.g., indications that the traffic is C2 traffic, indications that the traffic is malicious traffic, indications that the traffic is benign/non-malicious, etc.). This query can be performed contemporaneously with receipt of the file or input string, or in response to a request from a user to scan the file. As one example, data appliance 102 can send a query (e.g., in the JSON format) to a frontend 142 of security platform 140 via a REST API. Using processing described in more detail below, security platform 140 will determine (e.g., using a malicious file detector that may use a machine learning model to detect/predict whether the file is malicious) whether the queried file is a malicious file (or likely to be a malicious file) and provide a result back to data appliance 102 (e.g., "malicious file" or "benign file").

Figure 2:
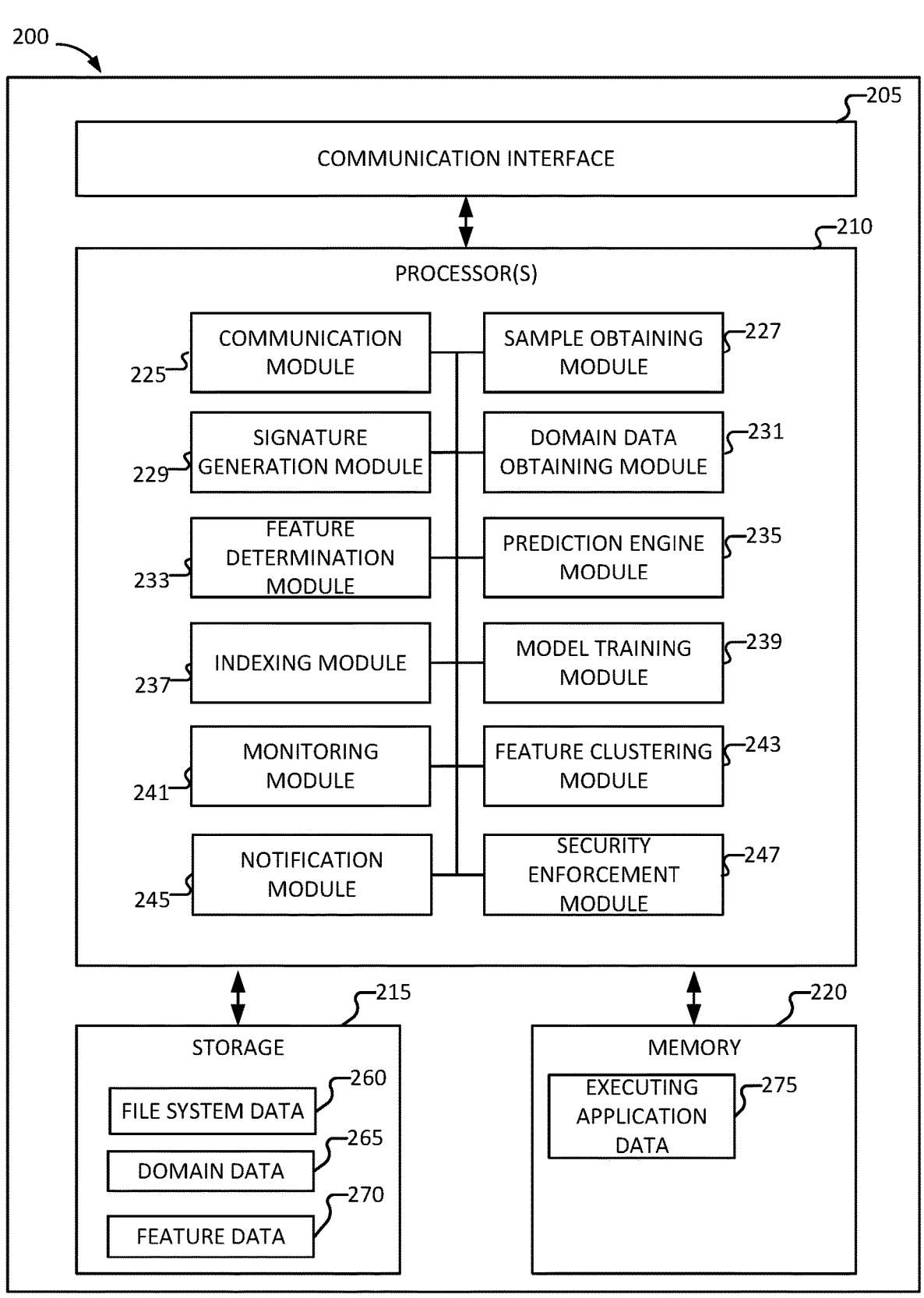
FIG. 2 is a block diagram of system for detecting the malicious traffic and attributing malicious traffic to a DNS tunneling campaign or tool according to various embodiments.

FIG. 2 is a block diagram of system for detecting the malicious traffic and attributing malicious traffic to a DNS tunneling campaign or tool according to various embodiments. According to various embodiments, system 200 is implemented in connection with system 100 of FIG. 1, such as for network traffic classifier 170. System 200 may implement at least part of system 400 of FIG. 4. In various embodiments, system 200 is implemented in connection with process 500 of FIG. 5, process 600 of FIG. 6, process 700 of FIG. 7, process 800 of FIG. 8, process 900 of FIG.

Figure 10:
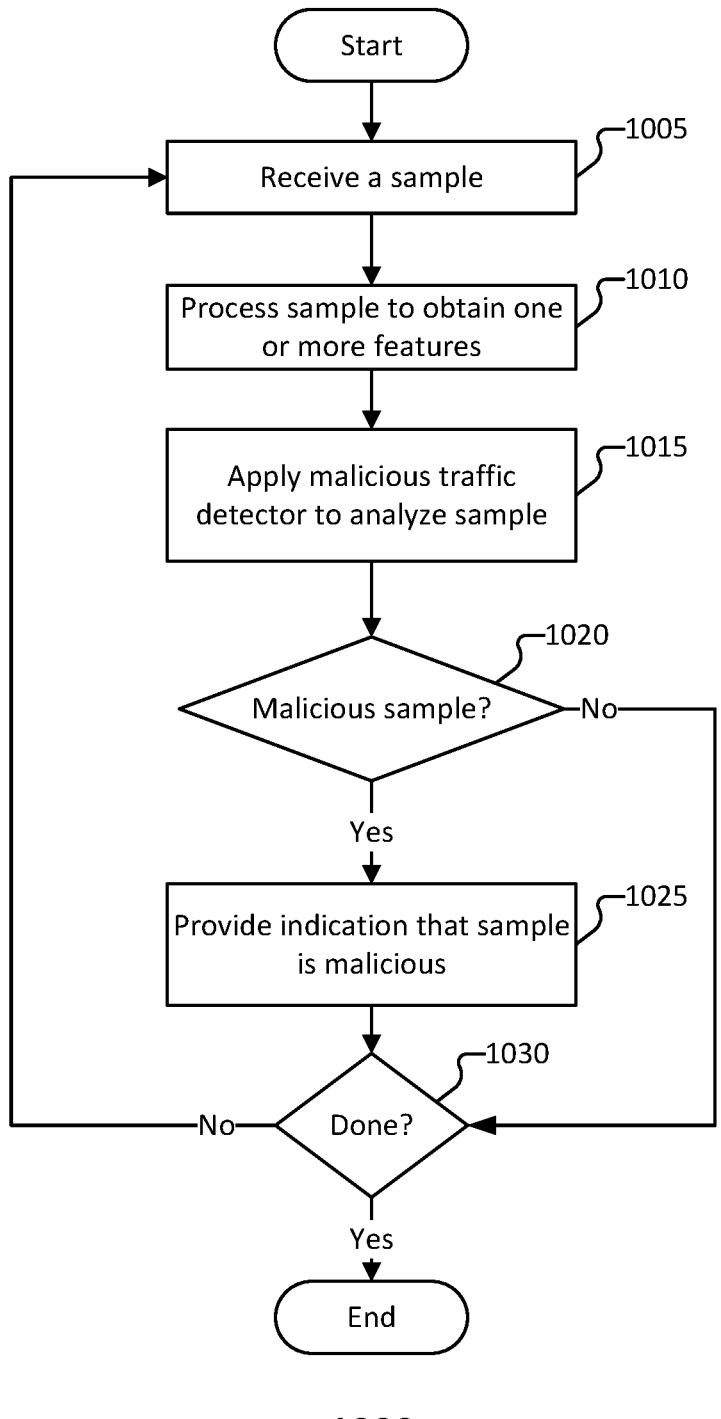
FIG. 10 is a flow diagram of a method for detecting malicious traffic according to various embodiments.
Figure 11:
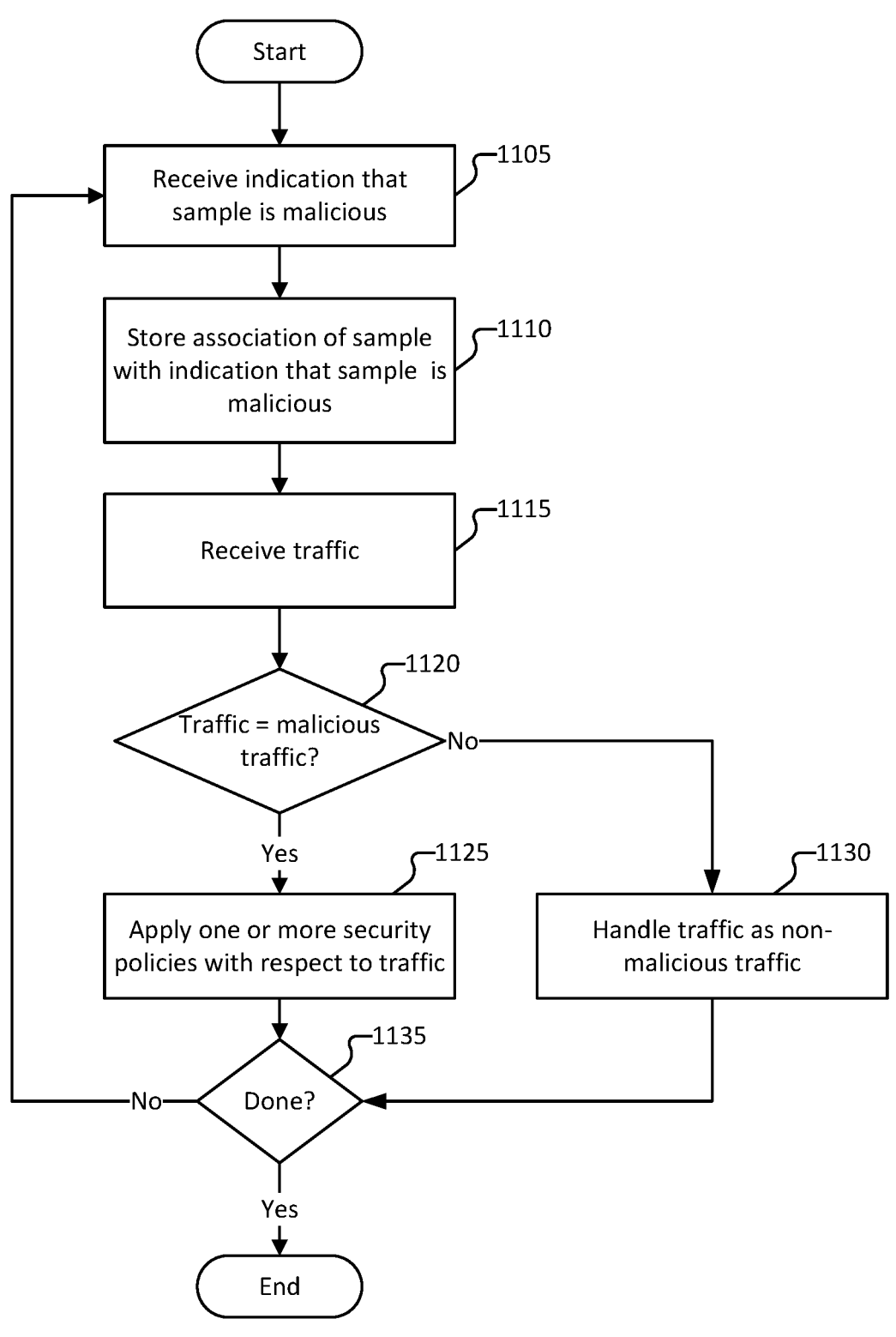
FIG. 11 is a flow diagram of a method for handling traffic according to various embodiments.
Figure 12:
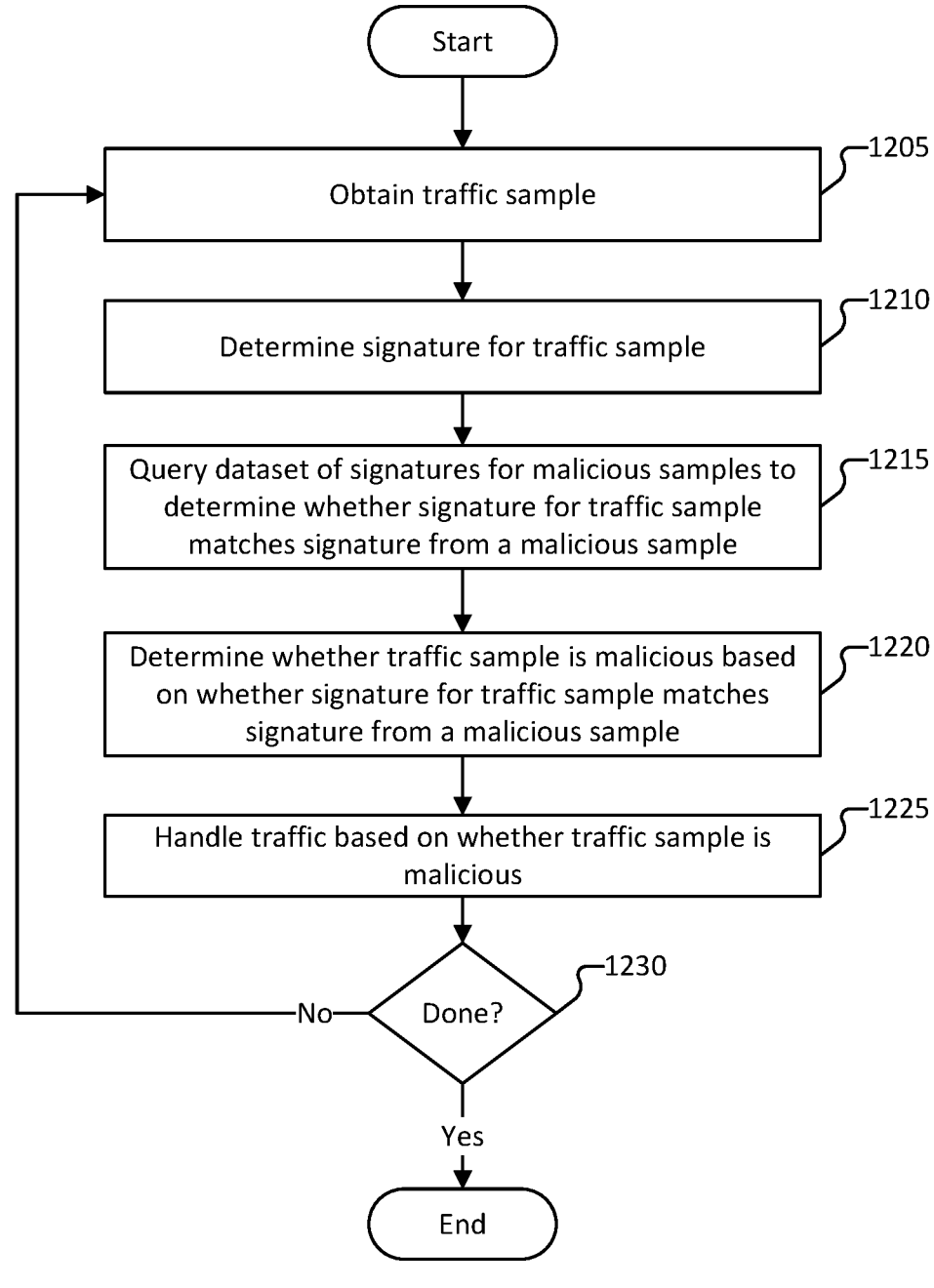
FIG. 12 is a flow diagram of a method for detecting malicious traffic according to various embodiments.
Figure 13:
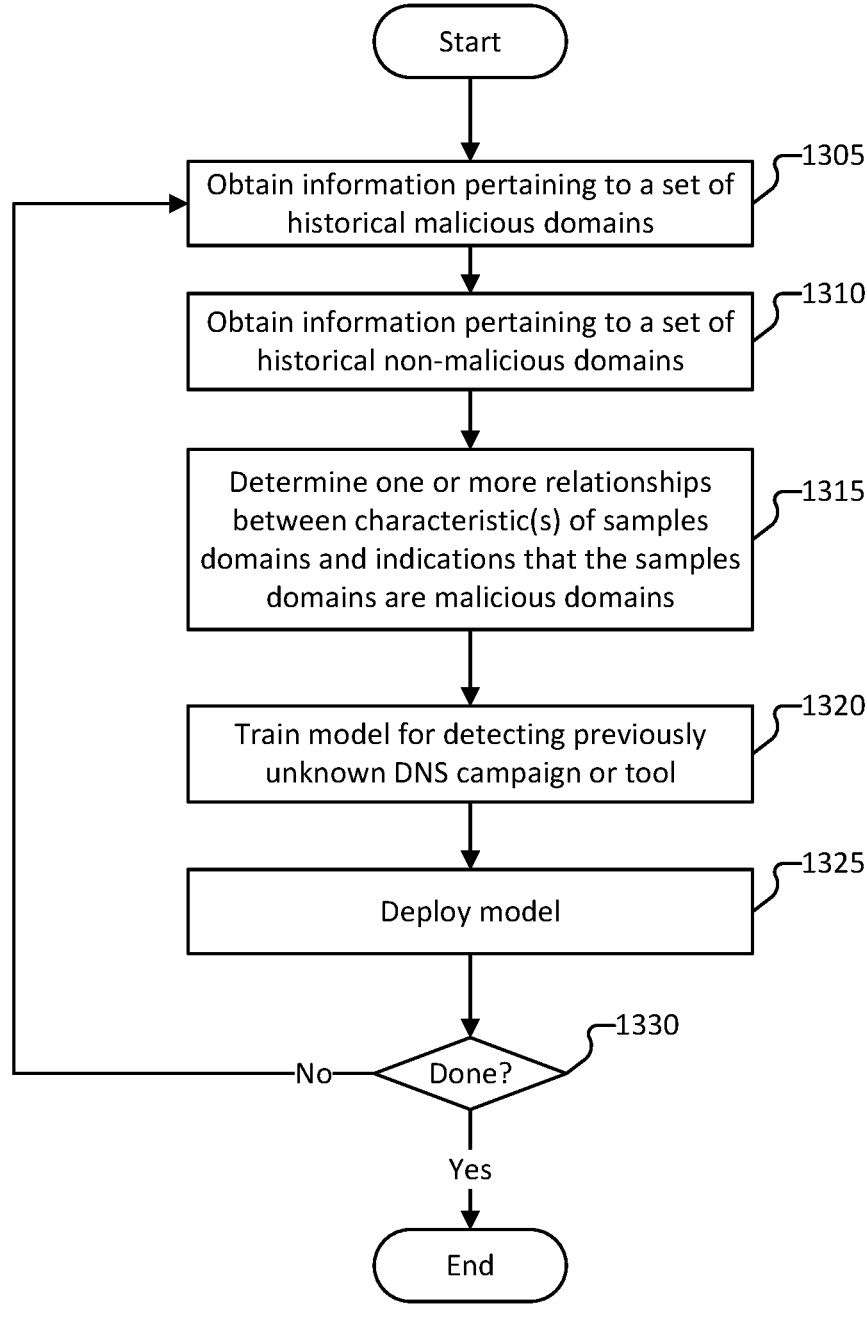
FIG. 13 is a flow diagram of a method for training a model according to various embodiments.

9, process 1000 of FIG. 10, process 1100 of FIG. 11, process 1200 of FIG. 12, and/or process 1300 of FIG. 13. System 200 may be implemented in one or more servers, a security entity such as a firewall, and/or an endpoint.

System 200 can be implemented by one or more devices such as servers. System 200 can be implemented at various locations on a network. In some embodiments, system 200 implements network traffic classifier 170 of system 100 of FIG. 1. As an example, system 200 is deployed as a service, such as a web service (e.g., system 200 determines whether traffic corresponding to a particular traffic sample is malicious or C2 traffic, and/or determines an attribution of a particular traffic sample to a DNS-tunneling campaign or tool, and provides such determinations as a service). The service may be provided by one or more servers. For example, system 200 or network traffic classifier is deployed on a remote server that monitors or receives network traffic that is transmitted within or into/out of a network and determines the traffic classification (e.g., whether the traffic is C2 traffic, whether the traffic is malicious, whether the traffic is non-malicious, an attribution of traffic to a particular DNS-tunneling campaign or tool, etc.) and sends/pushes out notifications or updates pertaining to the network traffic such as an indication of the application to which the network traffic corresponds or an indication of whether an application is malicious. As another example, the network traffic classifier is deployed on a firewall. In some embodiments, part of system 200 is implemented as a service (e.g., a cloud service provided by one or more remote servers) and another part of system 200 is implemented at a security entity or other network node such as a client device.

In some embodiments, system 200 receives network traffic and predicts a traffic classification (e.g., whether the traffic is C2 traffic, whether traffic is DNS-tunneling traffic, malicious traffic, or non-malicious traffic, etc.). System 200 can perform an active measure (or cause an active measure to be performed) in response to determining the traffic classification. For example, system 200 performs an active measure in response to determining that the traffic is C2 traffic or DNS-tunneling traffic (e.g., detecting C2 traffic). As another example, system 200 handles the traffic according to normal/benign traffic in response to determining that the traffic is not C2 traffic, not DNS-tunneling traffic, or is otherwise not malicious traffic.

In some embodiments, system 200 determines an attribution of traffic to a particular DNS-tunneling campaign or tool. System 200 can use the attribution of a traffic sample to determine or otherwise perform an incident response. For example, system 200 uses the attribution to identify the compromised host, identify an impact of a detected exploit, determine a severity of the detected DNS-tunneling traffic, and/or determine an active measure to be performed as an incident response. System 200 may use the attribution to determine that the DNS-tunneling traffic does not correspond to a C2 exploit. For example, system 200 can determine that DNS-tunneling is used as a Virtual Private Network (VPN) service. Most enterprise firewalls have a default enabling of a certain port(s) for two-way traffic (e.g., port 53 for DNS traffic). As such, DNS-tunneling can be used as a VPN service to circumvent censorship being enforced by the enterprise firewall. The attribution of network traffic can thus better guide system 200 to determine a severity and active measure to be performed. Traffic attributed to a known C2 exploit can be deemed more severe and urgent for performing an incident response than the DNS-tunneling being used as a VPN service.

System 200 implements one or more pipelines or services in connection with determining attributions of network traffic, detecting malicious traffic or DNS-tunneling traffic, training a classifier for detecting DNS-tunneling traffic or for attributing DNS-tunneling traffic to a particular characteristic (e.g., a DNS-tunneling campaign or tool, a particular activity such as malicious traffic or benign/less severe use of DNS-tunneling), identifying new DNS-tunneling campaigns or tools, etc. The pipelines or services may include one or more of (i) a manual investigation of DNS-tunneling traffic pipeline or service, (ii) a labeling pipeline or service, (iii) an attribution pipeline or service, and/or (iv) a monitoring pipeline or services.

In some embodiments, the manual investigation of DNS-tunneling traffic pipeline or service is performed to investigate tunneling domains for corresponding tools or campaigns (e.g., DNS-tunneling tools or campaigns). Currently, there are several campaigns or tools that are known to be associated with malicious traffic or DNS-tunneling traffic. For example, the network security industry has identified over fifty such campaigns or tools. The known campaigns or tools may be identified by system 200 or by a third party, such as a third-party service (e.g., VirusTotal™) or other network security providers or specialists. The manual investigation includes collecting or identifying traces for the campaigns or tools to label datasets. For example, system 200 determines/labels known domains for the known campaigns or tools.

In some embodiments, the labeling pipeline or service is performed to extract related features for known domains. In response to determining a labelling of domains (e.g., labelling domains as benign domains, or malicious domains or domains for DNS-tunneling traffic campaigns or tools), system 200 performs a data collection with respect to the labeled known domains. System 200 uses the collected data to compute features and perform feature indexing based on a feature database.

In some embodiments, the attribution pipeline or service extracts tunneling-related features for unknown domains and compare them against known domains. In response to determining features for labeled domains and an indexing of the features, system 200 can perform an attribution of a traffic sample based on collected information pertaining to the traffic sample and an index of features for known domains. System 200 performs a lookup against the feature index to determine whether the traffic sample corresponds to a known DNS-tunneling campaign or tool or otherwise a malicious exploit, and in response to determining that the traffic sample matches a campaign or tool in the index, system 200 attributes the traffic sample to the matching campaign or tool.

In some embodiments, the monitoring pipeline or services is performed to identify new candidate campaigns or tool (e.g., DNS-tunneling campaigns or tool) for manual check. System 200 stores an index comprising a mapping of features to known campaigns or tools. In response to identifying traffic samples that do not have a corresponding match in the index, system 200 can detect new campaigns or tools to which the unmatched traffic samples correspond. For example, system 200 performs a clustering to identify new campaigns or tools and updates the index to include features associated with the new campaigns or tools. System 200 may periodically analyze the unmatched traffic samples to detect new campaigns or tools, such as according to a predefined time period. Additionally, or alternatively, system 200 analyzes the unmatched traffic samples to detect new campaigns or tools in response to a particular criteria being satisfied, such as a sufficiently large sample set of unlabeled/unmatched traffic samples.

In some embodiments, system 200 performs real-time attribution of DNS-tunneling traffic to a particular campaign or tool (e.g., a DNS-tunneling campaign or tool) and/or identifying new campaigns or tools. System 200 comprises one or more modules to perform (i) collection of information pertaining to the traffic sample (e.g., collecting traffic information, infrastructure information, and/or auxiliary information), (ii) compute features for the information pertaining to the traffic sample (e.g., computing lexical, infrastructural, statistical, and auxiliary features), (ii) match unknown domains against known domains (e.g., determine that the traffic sample corresponds to a known campaign or tool), and/or (iv) identify new labels (e.g., new campaigns or tools).

In the example shown, system 200 implements one or more modules in connection with generating a set of network traffic samples to train/update a classifier, training/updating a classifier, predicting a traffic classification, determining a likelihood that traffic is C2 traffic or malicious traffic, determining a likelihood that traffic is benign/non-malicious traffic etc. System 200 comprises communication interface 205, one or more processor(s) 210, storage 215, and/or memory 220. One or more processors 210 comprises one or more of communication module 225, sample obtaining module 227, signature generation module 229, domain data obtaining module 231, feature determination module 233, prediction engine module 235, indexing module 237, model training module 239, monitoring module 241, clustering module 243, notification module 245, and security enforcement module 247.

In some embodiments, system 200 comprises communication module 225. System 200 uses communication module 225 to communicate with various nodes or end points (e.g., client terminals, firewalls, DNS resolvers, data appliances, other security entities, etc.), third party services (e.g., to obtain information pertaining to known exploits or known DNS-tunneling campaigns or tools), or user systems such as an administrator system. For example, communication module 225 provides to communication interface 205 information that is to be communicated (e.g., to another node, security entity, etc.). As another example, communication interface 205 provides to communication module 225 information received by system 200. Communication module 225 is configured to receive an indication of samples (e.g., HTTP requests, URLs, URIs, network traffic, etc.) to be analyzed, such as from network endpoints or nodes such as security entities (e.g., firewalls), database systems, query systems, etc. Communication module 225 is configured to query third party service(s) for information pertaining to the network traffic classifications (e.g., services that expose information/classifications for signatures/hashes of network traffic such as third-party scores or assessments of maliciousness of particular traffic, a community-based score, assessment, or reputation pertaining to domains or applications, a blacklist for domains, applications, or certain types/signatures of network traffic such as HTTP requests, and/or a whitelist for domains, applications, or other certain types of network traffic such as a list or index of DNS-tunneling campaigns or domains, etc.). For example, system 200 uses communication module 225 to query the third-party service(s) for information pertaining to known exploits or campaigns or tools. Communication module 225 is further configured to receive one or more settings or configurations from an administrator. Examples of the one or more settings or configurations include configurations of a process determining whether a particular type of traffic (e.g., a particular HTTP request) is permitted, malicious, benign, etc., a format or process according to which a feature vector or embedding is to be determined, a set of feature vectors or embeddings to be provided to a classifier for determining the traffic classification (e.g., for predicting whether traffic is C2 traffic, or predicting whether the traffic is malicious/non-malicious), a set of feature vectors or embeddings to be provided to a classifier for determining an attribution to a DNS-tunneling campaign or tool, a set of predefined signatures to be assessed or counted, information pertaining to a whitelist of domains, applications, nodes, or signatures for traffic (e.g., traffic that is not deemed suspicious or malicious, traffic that is not deemed DNS-tunneling traffic, traffic that is not deemed to match a known DNS-tunneling campaign or tool, etc.), information pertaining to a blacklist of domains, applications, nodes, or signatures for traffic (e.g., traffic that is deemed to be suspicious or malicious and for which traffic is to be quarantined, deleted, or otherwise to be restricted from being executed/transmitted), etc.

In some embodiments, system 200 comprises sample obtaining module 227. System 200 uses sample obtaining module 227 to obtain a request to perform a traffic classification (e.g., predict a traffic classification or otherwise classify a sample as malicious, benign, C2 traffic, or DNS-tunneling traffic, etc.), and/or to obtain a request to perform a traffic attribution. Sample obtaining module 227 may obtain a network traffic sample collected by an inline security entity, such as a firewall, or a network traffic for which another system or service requests a predicted traffic classification. Sample obtaining module 227 may further obtain a request (or other indication) to train or update a classifier and/or a request for a set of network traffic samples for training/updating the classifier. For example, system 200 retrains/updates a classifier (e.g., for predicting a traffic classification, a traffic attribution, or detecting a new campaign, tool, or exploit) according to a predefined frequency or in response to one or more criteria being satisfied (e.g., the criteria can be defined in an updating policy, etc.).

In some embodiments, system 200 comprises signature generation module 229. System 200 uses signature generation module 229 to generate a signature pertaining to a network traffic sample for which system 200 is classifying (e.g., predicting a traffic classification). Signature generation module 229 can generate the signature according to a predefined process. For example, signature generation module 229 implements a hashing algorithm to determine a hash for the network traffic sample. Signature generation module 229 may determine the hash for the network traffic sample based on hashing the header of the network traffic sample. Example of hashing algorithms that may be implemented in connection with determining a signature include MD5, SHA-1, SHA-2, SHA-256, NTLM, LANMAN, RIPEMD-160, etc. Various other predefined processes may be implemented to determine the signature.

In some embodiments, system 200 comprises domain data obtaining module 231. System uses domain data obtaining module 231 to obtain information pertaining to a domain or traffic sample. In some embodiments domain data obtaining module 231 obtains one or more of traffic information, infrastructural information, and/or auxiliary information. Domain data obtaining module 231 may obtain a plurality of types of information (e.g., traffic information, infrastructural information, and/or auxiliary information) in parallel or contemporaneously, such as to minimize the delay in traffic classification or traffic attribution (e.g., to a DNS-tunneling campaign or tool).

The traffic information may comprise DNS traffic-based information. The DNS traffic-based information may correspond to DNS-traffic against the tunneling domain and may be collected from customer devices (e.g., DNS query log and telemetry responses) and/or third-party sources (e.g., passive DNS (pDNS) sources, such as a service by Farsight).

The infrastructural information may be indicative of a manner in which the domain is configuring. The infrastructural information may include one or more of registration information, hosting IPs, nameserver domains, nameserver IPs, tunneling subdomains if applicable, open ports and running services on hosting IPs and nameserver IPs, website content if applicable, certificate information if applicable, WhoIS information, active DNS information. The infrastructural information is collected through active probing (e.g., data.attacker.com NS ns1.attacker.com, ns1.attacker.com A 1.2.3.4), and/or third-party sources (e.g., registration information by WhoisXML).

The auxiliary information may comprise other information that is deemed useful for attribution. The auxiliary information can be customer-specific (e.g., customer name and industry) or customer-agnostic (e.g., samples communicating with these domains, verdicts of domain/IP/samples). The samples and verdicts can be collected from a network security service (e.g., the WildFire service provided by Palo Alto Networks), and/or third-party sources (e.g., VirusTotal).

In some embodiments, system 200 comprises feature determination module 233. System uses feature determination module 233 to perform an embedding (or feature) extraction with respect to a particular network traffic sample. In some embodiments, system 200 uses feature determination module 233 to determine a set of feature vectors or a combined feature vector to use in connection with classifying a sample, such as determining whether a sample (e.g., the network traffic sample) is malicious (e.g., using a detection model, such as a classifier), or whether a sample corresponds to a DNS-tunneling campaign or tool. In some embodiments, feature determination module 233 determines a set of one or more feature vectors based at least in part on information pertaining to the sample, such as the domain data obtained by domain data obtaining module 231 (e.g., the traffic information, the infrastructural information, and/or the auxiliary information).

The feature determination module 233 consumes information obtained from the domain data obtaining module 231 and computes various features. For example, feature determination module 233 determines four types of features: (i) lexical features, (ii) statistical features, (iii) infrastructural features, and (iv) auxiliary features. The various types of features are further described in connection with system 400 of FIG. 4.

A typical tunneling query consists of four parts: query type, encoded data, tunneling subdomain (optional) and root domain, the whole query pattern is: $encoded_data.$tunneling_subdomain.$root_domain, and a real-world example is: lnx.1002db82309.35035cba.dns.systemscpn.com with query_type TXT, where encoded_data="lnx. 1002db82309.35035cba", tunneling_subdomain="dns", root_domain="systemscpn.com". This example tunneling query will be sent to a nameserver controlled by attackers to receive the exfiltrated data and manipulate tunneling responses. The tunneling queries are sent to the nameserver controlled by the attackers achieved by adding NS record and glue A record, e.g., dns.systemscpn.com NS ns1.systemscpn.com, ns1.systemscpn.com A 185.217.1.24. With this setup, the attacker can receive the tunneling query and respond with infiltration payload. A typical tunneling response comprises of 2 parts: a response type and encoded data. A real-world example of a tunneling response is: response_type TXT with encoded data: "3sbpw3ealt2xnbrg9ezx/g3shr19v8w1fas90ineob2ohgrfx/ ogqs5s+brpyaztn5avh8otcylvnqff6bvhe+ jmewt69cjh3zqtiffk6mv6zqutducvunxzgj+yqdy2skvre76e+ kfsdczhglosab2qbajjmpomoa8czil6/4 5ccfc9vbzchaqplvzjnkxvxaljbegrisoknklpg9weusflv1 3hgpzrfocnkunjukkj9zjtyohljz9p9e4o". Different response types encode the data in different ways. For example, A/AAAA response types encode 4-bytes/16-bytes data as IPv4/IPv6 addresses. Domain-alike response types (e.g., CNAME/MX/NS/SRV/PTR) encode variable-size data as domains. TXT response type encodes variable-size data as raw bytes/strings.

In some embodiments, system 200 comprises prediction engine module 235. As an example, system 200 uses prediction engine module 235 to determine a traffic classification, such as to predict whether the sample corresponds to C2 traffic or DNS-tunneling traffic, predict whether the sample corresponds to malicious traffic, and/or predict whether the sample corresponds to benign/non-malicious traffic. Prediction engine module 235 determines the traffic classification based on querying a classifier, such a machine learning model. In some embodiments, the classifier is a CNN model that predicts the traffic classification based on the header embeddings.

In some embodiments, prediction engine module 235 obtains a prediction of an attribution of a traffic sample(s) to a DNS-tunneling campaign or tool. Prediction engine module 235 may predict the attribution based at least in part on the features computed at feature determination module 233, such as the lexical features, the statistical features, the infrastructural features, and/or auxiliary features. In response to obtaining the features from feature determination module 233, prediction engine module 235 performs a lookup in a database of known/unknown domains and corresponding features based at least in part on the obtained features. For example, prediction engine module 235 looks up the obtained features against the database to identify the matching known/unknown domains and labels and corresponding feature frequencies in each label.

In some embodiments, prediction engine module 235 implements a matching technique to determine whether the obtained features generated from the tunneling domain (e.g., the features corresponding to the traffic sample being analyzed) matches any known labeled data. For example, prediction engine module 235 performs a matching against an index of labeled data, such as an index obtained by indexing module 237. In various implementations, prediction engine module 235 performs the normalized Term Frequency-Inverse Document Frequency (TF-IDF) algorithm as a matching technique. In such a matching technique, q denotes the set of features generated by the computation module, t denotes each feature in q (e.g., t in q), d denotes the target label to check, f(t, d) denotes the frequency that feature t appears in label d, n(t) denotes the number of labels and unknown domains that t appeared in, D denotes the corpus of indexed labels and unknown domains. Prediction engine module 235 computes the feature score $s(q, d, D) = \text{sum}(TF\text{-}IDF(t, d, D))/\text{sum}(\max(TF\text{-}IDF(t, *, D)))$. The divisor is the normalizing term to let $s(q, d, D)$ has a range of [0, 1], to allow thresholding. In some embodiments, prediction engine module 235 implements a TF-IDF technique that is double normalization TF and standard IDF. As an example, the formula for the TF-IDF technique is: $TF(t, d)=0.5+0.5*f(t, d)/max (f(t, *))$, $IDF(t, D)=log (D/n(t))$. Using the above formula, prediction engine module 235 uses a labeled dataset to identify a threshold S for s(q, d, D), such that when the feature score is larger than S, the features q is considered a match for label d (e.g., the input tunneling domain is deemed matching the corresponding tool or campaign). In various embodiments, prediction engine module 235 selects a threshold in order to be able to differentiate different labels, as well as unlabeled domains.

In some embodiments, in connection with performing a traffic classification, prediction engine module 235 may query the classifier and obtain an indication of a likelihood that the sample corresponds to malicious traffic (e.g., C2 traffic). Prediction engine module 235 may determine that the sample corresponds to malicious traffic in response to determining the likelihood that the sample corresponds to malicious traffic obtained based on querying the classifier exceeds a predefined malicious traffic likelihood threshold.

According to various embodiments, prediction engine module 235 implements a classifier (e.g., a machine learning model) to classify the network traffic (e.g., an obtained sample or record from a network traffic log) based on the embeddings. System 200 may train the classifier, or system 200 may obtain the classifier from a service. The classifier is trained based at least in part on a machine learning process. Examples of machine learning processes that can be implemented in connection with training the classifier(s) include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN) clustering, principal component analysis, a convolutional neural network (CNN), etc. In some embodiments, system 200 implements a CNN model. The classifier provides a predicted classification (e.g., a machine learning-based predicted classification), such as a prediction of whether the traffic is C2 traffic, a prediction of whether the corresponding traffic (e.g., domain corresponding to the access path) is malicious, or a likelihood that the traffic is malicious (e.g., whether the traffic is exploit traffic).

In some embodiments, system 200 comprises indexing module 237. System 200 uses indexing module 237 to index features obtained by the feature determination module, such as an index of labeled data corresponding to the obtained features. Indexing module 237 consumes the features generated by the feature determination module 233 and stores the features as key-value pairs in the database such as to allow fast-lookup. In some embodiments, labeled data that is indexed corresponds to tool or campaign information that is indexed as labels (e.g., known DNS-tunneling campaigns, tools, etc.).

A single domain can have multiple labels. For example, a domain may be labeled as an open source tunneling tool to launch an attack campaign against a particular customer. Each domain can be indexed with or without labels. In some embodiments, indexing module 237 maintains the one or more of the following mappings in connection with indexing: (1) a feature to domain mapping to allow lookup features for related domains and labels, (2) a domain to feature mapping to allow lookup domains for related features, (3) a feature to label frequency mapping to allow lookup features for related labels and their frequencies among same-label domains, (4) a label to feature frequency mapping to allow lookup labels for related features and their frequencies among same-label domains, (5) labeled domains to corresponding labels mapping to allow lookup labels associated with manually labeled domains, (6) unknown domains to latest indexing timestamp mapping to allow lookup domains for their latest indexing timestamp, (7) labeled features to corresponding labels mapping to allow lookup labels associated with manually labeled features.

In some embodiments, indexing module 237 is optional. Indexing module 237 can be used to achieve low-latency in determining attribution. For example, system 200 can still perform attribution in implementations without using indexing module 237—attribution may take longer, but can still function as expected.

In some embodiments, system 200 comprises model training module 239. System 200 uses model training module 239 to train a classifier, such as a machine learning model used to perform traffic classification (e.g., to predict whether a sample corresponds to malicious traffic (e.g., C2 traffic), or to identify a particular malicious traffic to which the sample corresponds). In connection with training the classifier, model training module 239 collects a training set of samples. Samples in the training set may collected from one or more of (i) network traffic (e.g., monitored network traffic that was previously classified), (ii) a third-party service that provides a set of previously classified samples (e.g., a whitelist of benign samples, a blacklist of malicious samples, etc.), or (iii) generating the network traffic samples, such as by creating a fuzzing.

In some embodiments, system 200 comprises monitoring module 241. System 200 uses monitoring module 241 to monitor the database of analyzed traffic samples, such as features computed for the traffic samples, the index of labeled data, etc. As an example, monitoring module 241 periodically scans the database and allows specification of predefined set of rules and determines if these rules are triggered. The triggering of the predefined set of rules may correspond to the identification of a new DNS-tunneling campaigns or tools. An example of a rule is nameserver IPs being shared by over N number of tunneling domains.

In some embodiments, monitoring module 241 implements a clustering technique to identify new DNS-tunneling campaigns or tools. Performing a clustering includes invoking feature clustering module 243 to identify new clusters. Once a rule is triggered or a new cluster is identified, the system determines to investigate tunneling domains for corresponding tools and campaigns (e.g., to label the domains or corresponding features). For example, the system invokes a manual investigation (e.g., provides a notification to a domain expert to review). If the new cluster is valid and a new label (e.g., a new tool or campaign) is identified, the corresponding domains are indexed through the labeling pipeline (e.g., by indexing module 237) to enable future matches against this new label.

In some embodiments, system 200 comprises clustering module 243. System 200 uses clustering module 243 to implement a clustering technique in connection with identifying new clusters, such as for identifying new labels (e.g., a new tool or campaign). As an example, the clustering technique includes clustering algorithms such as K-means++ and X-means to check for new clusters and notifying maintainers (e.g., subject matter experts, or another service for identifying emergent campaigns or tools) for manual investigation and labeling. Clustering module 243 may provide the monitoring module 241 with an indication of a new cluster in response to detecting a new cluster among the database of traffic samples.

In some embodiments, system 200 comprises notification module 245. System 200 uses notification module 245 to provide an indication of the traffic classification, such as an indication whether the traffic is malicious, an indication whether the traffic is malicious traffic, etc. Additionally, or alternatively, system 200 uses notification module to provide an indication of an attribution of a traffic sample to a DNS-tunneling campaign or tool, or an indication that the traffic sample does not match a known campaign or tool. Notification module 245 provides the indication (e.g., the report) to another system or service, such as inline security or other security entity requesting the traffic classification or otherwise handling the traffic, or an administrator system (e.g., used by a network administrator while evaluating a security policy posture, etc.), etc. Notification module 245 may also provide an indication of an active measure to be implemented or a recommendation for an active measure to be implemented (e.g., a recommendation for handling the traffic based on the traffic classification, a recommendation for a remedial action to be performed in response to detection that a traffic sample matches a known campaign or tool, etc.).

System 200 may use notification module 245 to provide to one or more security entities (e.g., a firewall), nodes, or endpoints (e.g., a client terminal) an update to a whitelist of traffic, such as a whitelist of IP addresses (e.g., IP addresses from which HTTP requests originate) or a whitelist of traffic signatures (e.g., hashes for samples deemed to be benign). According to various embodiments, notification module 245 obtains a hash, signature, or other unique identifier associated with the domain (e.g., a webpage for the domain) or network traffic, and provides the indication of whether the sample is malicious in connection with the hash, signature, or other unique identifier associated with the sample.

According to various embodiments, the hash of a sample corresponds to a hash of an IP address (e.g., the IP address from which the HTTP request originates), a hash of header information, a hash of header information that is formatted according to a predefined format, etc. A security entity or an endpoint may compute a hash of a sample or traffic monitored/analyzed. The security entity or an endpoint may determine whether the computed hash corresponding to the sample is comprised within a set such as a whitelist of benign traffic, and/or a blacklist of traffic, etc. If a signature for a received sample is included in the set of signatures for samples previously deemed malicious (e.g., a blacklist of samples), the security entity or an endpoint can prevent the transmission of the corresponding traffic or prevent traffic to/from a client device from which C2 traffic was collected.

In some embodiments, system 200 comprises security enforcement module 247. System 200 uses security enforcement module 247 enforces one or more security policies with respect to information such as network traffic, files, etc. System 200 may use security enforcement module 247 to perform an active measure with respect to the network traffic in response to detecting the that the traffic corresponds to malicious traffic. Additionally, or alternatively, system 200 may use security enforcement module 247 to perform a remedial measure in response to detecting that a traffic sample matches a known DNS-tunneling campaign or tool. Security enforcement module 247 enforces the one or more security policies based on whether the file is determined to be malicious. As an example, in the case of system 200 being a security entity (e.g., a firewall) or firewall, system 200 comprises security enforcement module 247. Firewalls typically deny or permit network transmission based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies. Other examples of policies include security policies such as ones requiring the scanning for threats in incoming (and/or outgoing) email attachments, website content, files exchanged through instant messaging programs, and/or other file transfers.

According to various embodiments, storage 215 comprises one or more of filesystem data 260, domain data 265, and/or feature data 270. Storage 215 comprises a shared storage (e.g., a network storage system) and/or database data, and/or user activity data.

In some embodiments, filesystem data 260 comprises a database such as one or more datasets (e.g., one or more datasets for domains, datasets comprising samples of network traffic, mappings of indications for network traffic or predicted traffic classifications for network traffic to the network traffic or hashes, signatures or other unique identifiers of the network traffic, such as a signature for the domains, mappings of indicators of benign traffic to hashes, signatures or network traffic, datasets for a set of profile seeds, datasets for a set of profiles generated based on the profile seeds, dataset for network traffic generated based on the profile seeds, etc.). Filesystem data 260 comprises data such as historical information pertaining to HTTP request data or network traffic, a whitelist of network traffic profiles (e.g., hashes or signatures for the HTTP request data) or IP addresses deemed to be safe (e.g., not suspicious, benign, etc.), a blacklist of network traffic profiles deemed to be suspicious or malicious, etc.

Domain data 265 comprises data pertaining to a traffic sample, such as data obtained by domain data obtaining module 231. In some embodiments, domain data 265 comprises traffic information, infrastructural information, and auxiliary information.

Feature data 270 comprises one or more features computed with respect to traffic samples. Feature data 270 may comprise an index of labels or features associated with a known DNS-tunneling campaign or tool.

According to various embodiments, memory 220 comprises executing application data 275. Executing application data 275 comprises data obtained or used in connection with executing an application such as an application executing a hashing function, an application to extract information from webpage content, an input string, an application to extract information from a file, or other sample, etc. Executing application data 275 may comprise data obtained in connection with executing an application to obtain domain data (e.g., collect traffic information, infrastructural information, auxiliary information, etc.), an application to compute features for obtained domain data, an application for matching features for the obtained domain data against indexed labeled data, an application for determining an active measure or other remedial action to be performed in response to determining an attribution of the traffic sample to a DNS-tunneling campaign or tool. Other applications comprise any other appropriate applications (e.g., an index maintenance application, a communications application, a machine learning model application, an application for detecting suspicious input strings, suspicious files, an application for detecting suspicious or unparked domains, an application for detecting malicious network traffic or malicious/non-compliant applications such as with respect to a corporate security policy, a document preparation application, a report preparation application, a user interface application, a data analysis application, an anomaly detection application, a user authentication application, a security policy management/update application, etc.).

Figure 3:
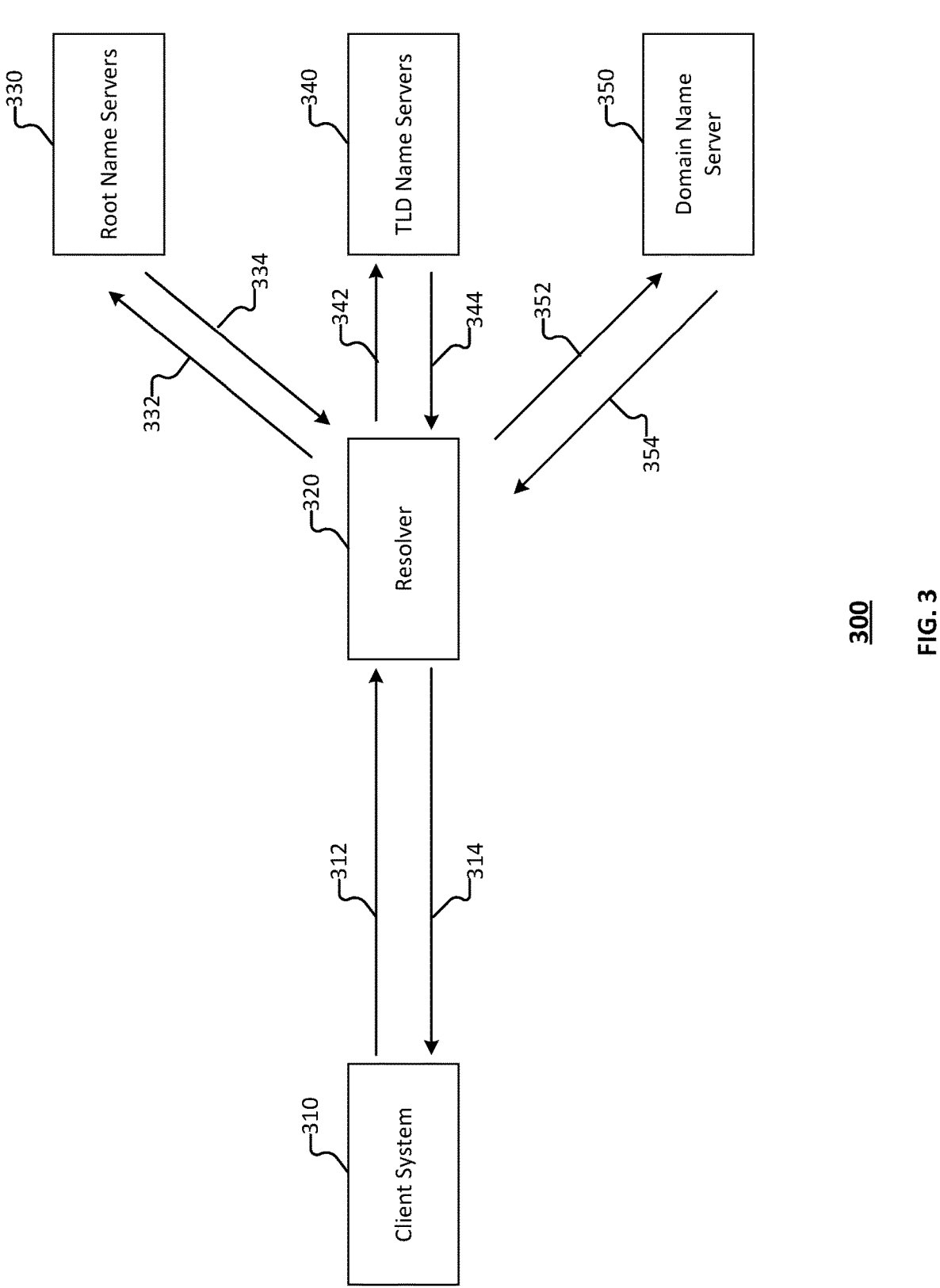
FIG. 3 illustrates a system for performing DNS tunneling.

FIG. 3 illustrates a system for performing DNS tunneling.

DNS tunneling is a technique to encode data of non-DNS programs and protocols within DNS queries and responses. The DNS tunneling enables all types of communication over the DNS protocol, including file transfer, command and control and web browsing.

DNS tunneling techniques generally use port 53 which is nearly always open on clients, systems, servers and firewalls to transmit DNS queries. Most enterprises implement relatively permissive policies for DNS traffic. Therefore, attackers are increasingly abusing the DNS protocol to communicate with C2 servers (e.g., malicious servers controlled by the attackers) and encode exfiltrated data in queries and malicious payload in responses via DNS tunneling. Well-known attack campaigns such as SolarWinds, OilRig, xHunt and DarkHydrus have employed DNS tunneling techniques. The permissive policies on DNS traffic allow the attackers to reach the Internet and the large amount of benign DNS traffic becomes a natural disguise for attackers to hide their footprint.

DNS tunneling generally requires two main components: (1) a client component, and (2) a server component. The client component is configured to send DNS packets to the Internet, encode generic messages as DNS queries, and decode generic messages from DNS responses. The server component is configured to receive DNS queries from recursive resolvers, decode generic messages from DNS queries and encode generic messages as DNS responses. The example shown in FIG. 3 illustrates the DNS tunneling process at a high level.

In the example shown, client system 310 encodes a secret value as the subdomain $secret and sends out DNS query 312, such as the DNS query $secret.badsite.com. In response to receiving DNS query 312, resolver 320 (e.g., the server components) iteratively queries name servers of different domain levels until resolver 320 receives a valid response. For example, in the example shown, resolver 320 sends query 332 (e.g., queries for the IP for $secret.basdsite.com) to root name servers 330, sends query 342 (e.g., queries for the IP for $secret.basdsite.com) to TLD name servers 340, and/or sends query 352 (e.g., queries for the IP for $secret.basdsite.com) to domain name servers 350. Resolver 320 can poll for response 334 (e.g., ask.com) for query 332, response 344 for query 342 (e.g., an indication to ask basdsite.com), and/or response 354 for query 352 (e.g., an indication to visit $payload.bs.com instead).

As illustrated in FIG. 3, the server component would receive and decode the encoded message $secret. Optionally, the server component (e.g., domain name servers 350, root name servers 330, TLD name servers 340, etc.) would encode malicious payload as the subdomain $payload and send out the DNS response: $secret.badsite.com CNAME $payload.bs.com. The client component receives and decodes the encoded message $payload. If the secret value or the malicious payload exceeds the size of a single DNS packet, the client component and server component may break the DNS packets into a plurality of DNS packets and send as multiple queries and responses.

To enable the client component to send generic messages, DNS tunneling tools use an encoding algorithm to fragment and map the message to characters or values acceptable by the DNS protocol. Virtually, any party can generate an algorithm to perform the fragmentation and mapping. However, currently, several ready-to-use DNS tunneling tools exist, thereby reducing the complexity of deploying a malicious exploit. Examples of predefined DNS tunneling tools include open-source tools and/or proprietary tools. Examples of open-source DNS tunneling tools include iodine, DNSStager, dnscat2, and sliver. An example of an open-source DNS tunneling tool includes Cobalt Strike. These tools support encoding generic messages as subdomains of the DNS queries and as various types of DNS responses, such as A (IPv4 address), AAAA (IPv6 address), TXT, CNAME, MX etc.

Figure 4:
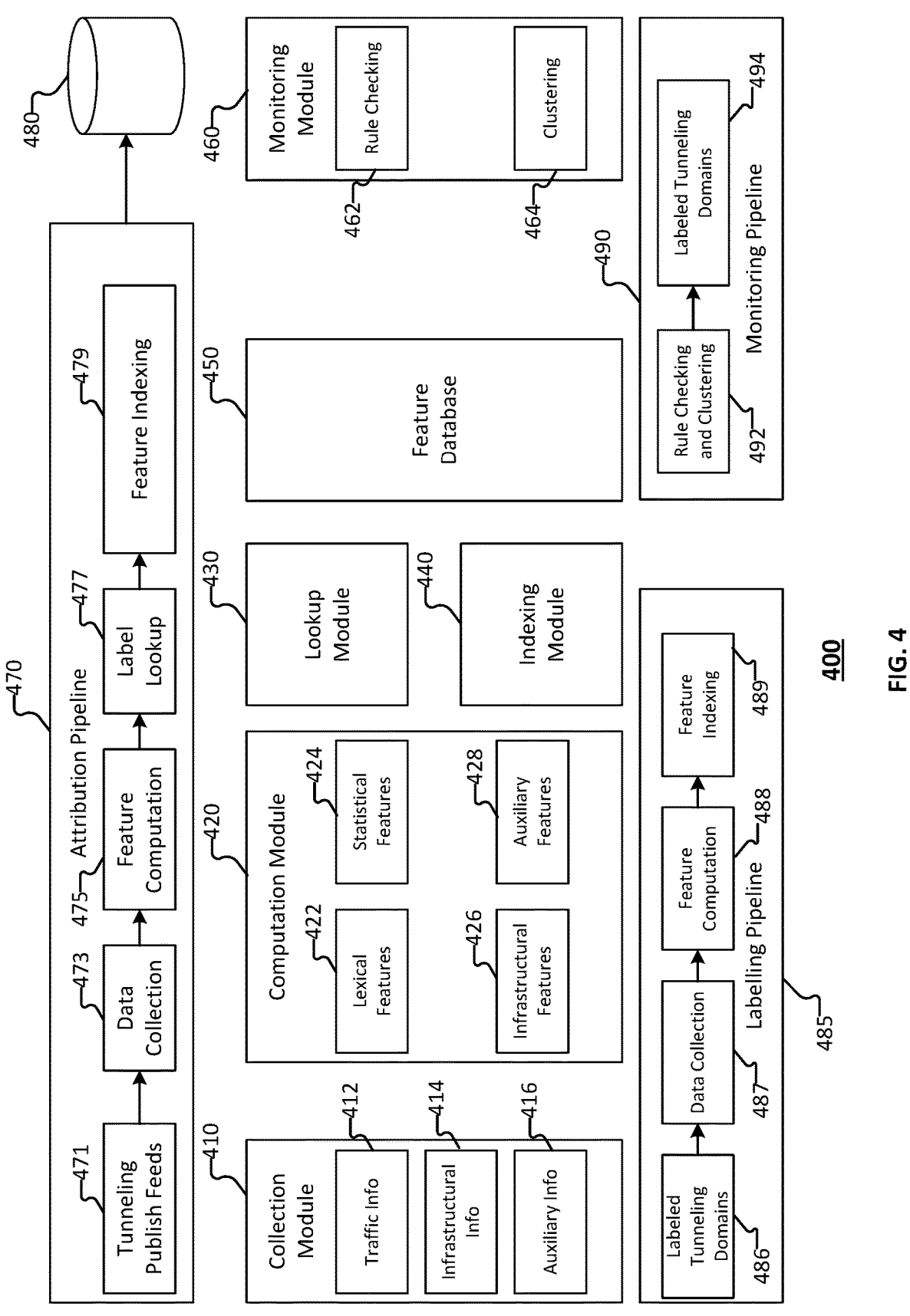
FIG. 4 illustrates a system for attributing network traffic to a DNS tunneling campaign or tool according to various embodiments.

FIG. 4 illustrates a system for attributing network traffic to a DNS tunneling campaign or tool according to various embodiments. According to various embodiments, system 400 is implemented in connection with system 100 of FIG. 1, such as for network traffic classifier 170, and/or system 200 of FIG. 2. In various embodiments, system 400 is implemented in connection with process 500 of FIG. 5, process 600 of FIG. 6, process 700 of FIG. 7, process 800 of FIG. 8, process 900 of FIG. 9, process 1000 of FIG. 10, process 1100 of FIG. 11, process 1200 of FIG. 12, and/or process 1300 of FIG. 13. System 400 may be implemented in one or more servers, a security entity such as a firewall, and/or an endpoint.

In the example shown, system 400 comprises collection module 410, computational module 420, lookup module 430, indexing module 440, feature database 450, and monitoring module 460. Various pipelines or services may be implemented using one or more of the foregoing modules. Examples of the pipelines or services that may be implemented include attribution pipeline, labelling pipeline 485, and/or monitoring pipeline 494.

System 400 analyzes traffic samples to determine whether the traffic sample corresponds to malicious traffic or to determine an attribution to a specific DNS-tunneling campaign or tool or a type of campaign or tool. Further, system 400 maintains (e.g., creates and updates) an index of labeled data (e.g., features or other information) associated with DNS-tunneling campaigns or tools, which can be used in connection with performing a quick look-up to perform attributions of traffic samples or detecting new DNS-tunneling campaigns or tools.

System 400 uses collection module 410 to obtain domain data associated with a traffic sample. In the example shown, collection module 410 collects traffic information 412, infrastructural information 414, and auxiliary information 416.

The traffic information may comprise DNS traffic-based information. The DNS traffic-based information may correspond to DNS-traffic against the tunneling domain and may be collected from customer devices (e.g., DNS query log and telemetry responses) and/or third-party sources (e.g., passive DNS (pDNS) sources, such as a service by Farsight).

The infrastructural information may be indicative of a manner in which the domain is configuring. The infrastructural information may include one or more of registration information, hosting IPs, nameserver domains, nameserver IPs, tunneling subdomains if applicable, open ports and running services on hosting IPs and nameserver IPs, website content if applicable, certificate information if applicable, WhoIS information, active DNS information. The infrastructural information is collected through active probing (e.g., data.attacker.com NS ns1.attacker.com, ns1.attacker.com A 1.2.3.4), and/or third-party sources (e.g., registration information by WhoisXML).

The auxiliary information may comprise other information that is deemed useful for attribution. The auxiliary information can be customer-specific (e.g., customer name and industry) or customer-agnostic (e.g., samples communicating with these domains, verdicts of domain/IP/samples). The samples and verdicts can be collected from a network security service (e.g., the WildFire service provided by Palo Alto Networks), and/or third-party sources (e.g., VirusTotal).

System 400 uses computation module 420 to compute features based on the collected information (e.g., traffic information 412, infrastructural information 414, and auxiliary information 416). In some embodiments, computation module 420 computes one or more of lexical features 422, statistical feature 424, infrastructural features 426, and/or auxiliary features 428.

Lexical features 422 refer to a manner in which tunneling queries and responses are constructed. Lexical features 422 may be based on one or more of the following: (1) subdomains, (2) a query/response type (e.g., an indication of a type of DNS records being used, an indication of whether the query and response are using an IP4-type address, etc.), (3) a query/response character set, (4) a query/response length (e.g., excluding the root domain part; some tools may use a fixed length query and response), (5) a query/response hostname length (some tools use a fixed length hostname), (6), a query/response kLD length (e.g., some tools use a fixed KLD length), (7), a query/response common kLD (e.g., some tools used a fixed length of the KLD, and other tools such as Cobalt Strike uses the exact same prefix(es) such as www, post, etc., (8) a query/response common characters (e.g., some tools use the same pattern, for example, the Pupy tool always uses digit 9 as a pattern; if a tool uses a fixed character at a fixed offset, then the system determines a feature capturing that pattern), (9) response IP locations and types (e.g., the system identifies a location at which the IP is located, and/or whether the IP is a private or public IP, etc.), and (10) TXT types.

In some embodiments, lexical features 422 include features for one or more of: (1) tunneling subdomains, (2) types of queries, (3) unique characters used in encoded data of queries, (4) length of queries, (5) encoded data length of queries, (6) length of subdomains in encoded data of queries, (7) common subdomains in encoded data of queries, (8) common characters in encoded data of queries at fixed offsets, (9) types of responses, (10) unique characters in encoded data of responses, (11) length of responses, (12) encoded data length of responses, (13) geographical locations of A/AAAA responses, (14) address types (private/public/not-assigned) of A/AAAA responses, (15) categories (email/server) of TXT responses, (16) common characters of TXT responses at fixed offsets, (17) length of subdomains in encoded data of domain-alike responses, (18) common subdomains in encoded data of domain-alike responses, (19) common characters in encoded data of domain-alike responses at fixed offsets, (20) root domains of domain-alike responses.

Statistical features 424 refer to patterns that can allow differentiating tunneling domains from statistical point of view. Statistical features 424 may be based on one or more of the following: (1) a query/response entropy (e.g., a measure of an extent of the randomness of the query or response), (2) a query/response meaningful word ratio (e.g., a measure of an extent of the randomness of a word ratio; if a query and response uses a sequence of patterns of a meaningful word ratio, then the word ratio would be a high value; conversely, if the query and response uses random characters, then the meaningful word ratio would be a relatively low value, (3) exfiltrated bytes (e.g., a measure of an amount of information communicated in the query and response), (4) infiltrated bytes, and (5) a query time range and intervals (e.g., attackers may do malicious activities at a fixed time or interval to avoid detection, such as performing a DNS tunneling every five minutes rather than a continuous tunneling activity; attackers may perform malicious activities at certain times of day, such as midnight, etc.).

In some embodiments, statistical features 424 include features for one or more of (1) entropy of queries, (2) entropy of responses, (3) meaningful word ratio of queries, (4) meaningful word ratio of TXT and domain-alike responses, (5) exfiltrated bytes per query, (6) infiltrated bytes per TXT and domain-alike response, (7) time range of queries, (8) intervals of queries.

Infrastructural features 426 refer to a manner in which the tunneling domain is setup/configured. Infrastructural features 426 may be based on one or more of the following: (1) root domain Ips, (2) nameserver domains and name server Ips, (3) WhoIS information, (4) IP locations and types, (5) open ports and running services, (6) website content, and (7) certificate information, etc.

In some embodiments, infrastructural features 426 include features for one or more of: (1) root domain Ips (e.g., the domain to which the query is resolved), (2) nameserver domains (e.g., the domains to which the domain/query resolves), (3) nameserver IPs (e.g., the IP to which the IP or domains resolve), (4) whois dates of root domain, (5) whois registrant of root domain, (6) whois dates of nameserver domains, (7) whois registrant of nameserver domains, (8) geographical locations of root domain IPs and nameserver IPs, (9) open ports and running services at root domain IPs and nameserver IPs (e.g., if certain ports are open, the ports are hosting website content, and the website content is corresponding collected), (10) website content at root domain IPs and nameserver IPs, (11) certificate at root domain IPs and nameserver IPs.

Auxiliary features 428 refer to all other information related to the tunneling domain that is deemed useful for attribution. Lexical features 422 may be based on one or more of the following: (1) a customer or organization associated with a network, (2) VirusTotal™ verdicts and samples, (4) tunneling related incident of compromise (IOC) feeds, etc.

In some embodiments, auxiliary features 428 includes features for one or more of: (1) customer information including device number, name and industry, (2) VirusTotal™ malicious verdicts and corresponding vendors for root domain, nameserver domains and their IPs, (3) VirusTotal™ recorded samples that communicate with root domain, nameserver domains and their IPs, (4) WildFire malicious verdicts for root domain, nameserver domains and their IPs, (5) WildFire recorded samples that communicate with root domain, nameserver domains and their IPs, (6) Tunneling related blogs and social media accounts.

In some embodiments, the system 400 uses lookup module 430 to perform a look up against labeled data, such as features indexed for known DNS-tunneling campaigns or tool. The labeled data may be stored in feature database 450. As an example, lookup module 430 may perform a hash or otherwise determine a signature for the feature and match the hash/signature against index labeled data. As another example, lookup module 430 implements a TF-IDF technique to quickly compare the computed features for the traffic samples to the indexed labeled data (e.g., the indexed features of known DNS tunneling campaigns or tools). Based on the comparison/matching to the labeled data, lookup module 430 determines whether the traffic sample (e.g., the computed features) matches a known DNS tunneling campaign or tool and in response to determining a match, identifying the traffic sample to a particular DNS tunneling campaign or tool (e.g., determines a campaign/tool attribution). Similarly, lookup module 430 can determine that the traffic sample does not match/correspond to any known DNS tunneling campaign or tool.

In some embodiments, the system 400 uses indexing module 440 to index labeled data. Indexing module 440 stores a relationship between features and labels, such as in feature database 450. For example, system 400 stores an index/mapping of features to corresponding DNS tunneling campaigns or tools (e.g., known campaigns or tools). The index can be used by lookup module 430 to quickly match traffic samples to known DNS campaigns or tools.

In some embodiments, the system 400 uses monitoring module 460 to monitor the database of analyzed traffic samples, such as features computed for the traffic samples, the index of labeled data, etc. Monitoring module can use one of more of a rule checking module 462 or a clustering module 464 to identify new DNS tunneling campaigns or tools. Rule checking module 462 may comprise a predefined set of rules or heuristics that are used to match features for traffic samples that do not correspond to known DNS tunneling campaigns or tools. The rules or heuristics may be defined by a subject matter expert or automatically, such as by using a machine learning technique. Clustering module 464 performs a clustering analysis with respect to the computed features for unmatched traffic samples.

In some embodiments, system 400 implements attribution pipeline or service 470. Attribution pipeline or service 470 may use collection module 410, computation module 420, lookup module 430, and indexing module 440. At 471, attribution pipeline or service 470 obtains published feeds pertaining to DNS tunneling campaigns or tools. At 473, attribution pipeline or service 470 performs domain data collection, such as by invoking collection module 410 to obtain traffic information 412, infrastructural information 414, and/or auxiliary information 415. In response to obtaining the domain data, at 475, attribution pipeline or service 470 performs a feature computation, such as by invoking computation module 420 to compute one or more of lexical features 422, statistical features 424, infrastructural features 426, and/or auxiliary features 428, etc. In response to obtaining features for the traffic sample, attribution pipeline or service 470 performs a label lookup, such as by invoking lookup module 430 to match the computed features to labeled data (e.g., data generated by indexing module 440). In response to performing the label lookup, at 479, attribution pipeline or service 470 performs feature, such as by invoking indexing module 440 to store labeled data in feature database 450. Attribution pipeline or service 470 provides a verdict for classifying/attributing the traffic sample, such as by storing the verdict in database 480 or returning the verdict to a security entity, such as a firewall that enforces predefined security policies/rules with respect to the traffic.

In some embodiments, system 400 implements labelling pipeline or service 485. Labelling pipeline or service 485 may use collection module 410, computation module 420, and indexing module 440. At 486, labelling pipeline or service 485 obtains labeled tunneling domains. At 487, labelling pipeline or service 485 performs data collection for such domains, such as by invoking collection module 410 to obtain traffic information 412, infrastructural information 414, and/or auxiliary information 416. At 488, labelling pipeline or service 485 performs a feature computation, such as by invoking computation module 420 to compute one or more of lexical features 422, statistical features 424, infrastructural features 426, and/or auxiliary features 428, etc. At 489, labelling pipeline or service 485 performs feature indexing, such as by invoking indexing module 440 to store a mapping of the computed features to a corresponding label (e.g., a known DNS tunneling campaign or tool).

In some embodiments, system 400 implements monitoring pipeline or service 490. Monitoring pipeline or service 490 implements one of more of monitoring module 460 and/or indexing module 440. For example, at 492, monitoring pipeline or service 490 performs a rule checking and/or clustering, such as by invoking monitoring module 460 to compare computed features for one or more unmatched traffic samples (e.g., computed features that do not match a labeled known DNS tunneling campaign or tool) to a predefined set of rules or performs clustering with respect to such computed features to detect new campaigns or tools.

Figure 5:
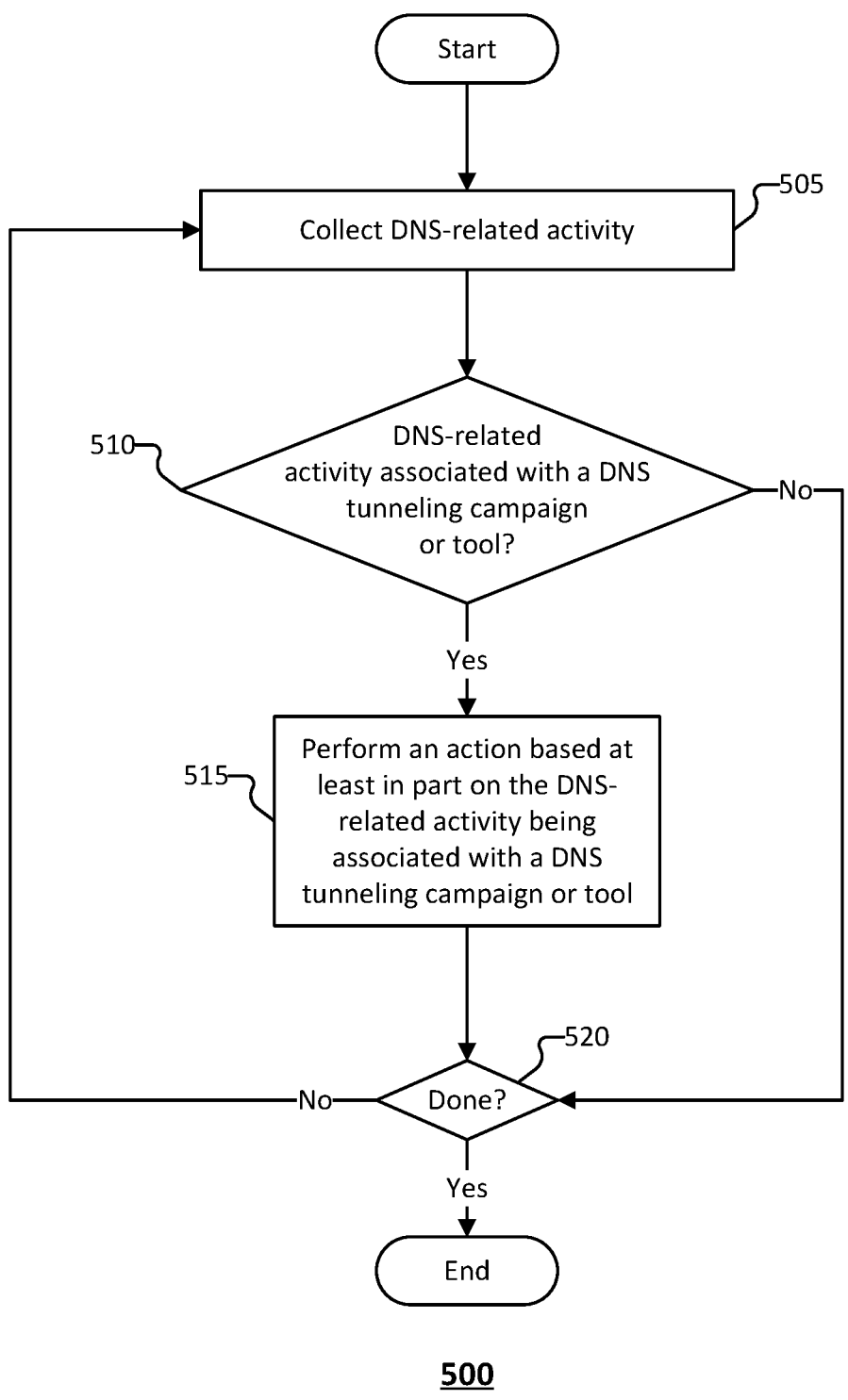
FIG. 5 is a flow diagram of a method for attributing network traffic to a DNS tunneling campaign or tool according to various embodiments.

FIG. 5 is a flow diagram of a method for attributing network traffic to a DNS tunneling campaign or tool according to various embodiments. In some embodiments, process 500 is implemented at least in part on by system 100 of FIG. 1, system 200 of FIG. 2, and/or system 400 of FIG. 4.

At 505, the system collects DNS-related activity. In some embodiments, the system collects traffic information, infrastructural information, and/or auxiliary information. At 510, the system determines whether the DNS-related activity is associated with a DNS tunneling campaign or tool. In some embodiments, the system determines whether the DNS-related activity associated with a DNS tunneling campaign or tool based at least in part on computing one or more features (e.g., lexical features, statistical features, infrastructural features, and/or auxiliary features) with respect to the collected information, and performs a matching of the computed features to labeled data (e.g., indexed data that maps features or other information to known DNS tunneling campaign or tool). In response to determining that the DNS-related activity is associated with a DNS tunneling campaign or tool, process 500 proceeds to 515 at which the system performs an action based at least in part on the DNS-related activity being associated with a DNS tunneling campaign or tool. The action may include notifying an administrator of the use of the DNS tunneling campaign or tool. Additionally, or alternatively, the action includes recommending (e.g., to an administrator or other user) a remedial action or active measure to be performed, or automatically performing the remedial action or active measure, such as to quarantine the traffic, etc. Conversely, in response to determining that the DNS-related activity is associated with a DNS tunneling campaign or tool, process 500 proceeds to 520. At 520, a determination is made as to whether process 500 is complete. In some embodiments, process 500 is determined to be complete in response to a determination that no further samples are to be analyzed (e.g., no further predictions for traffic are needed), no further traffic samples are to be attributed to benign activity or a DNS-tunneling campaigns or tools, an administrator indicates that process 800 is to be paused or stopped, etc. In response to a determination that process 500 is complete, process 500 ends. In response to a determination that process 500 is not complete, process 500 returns to 505.

Figure 6:
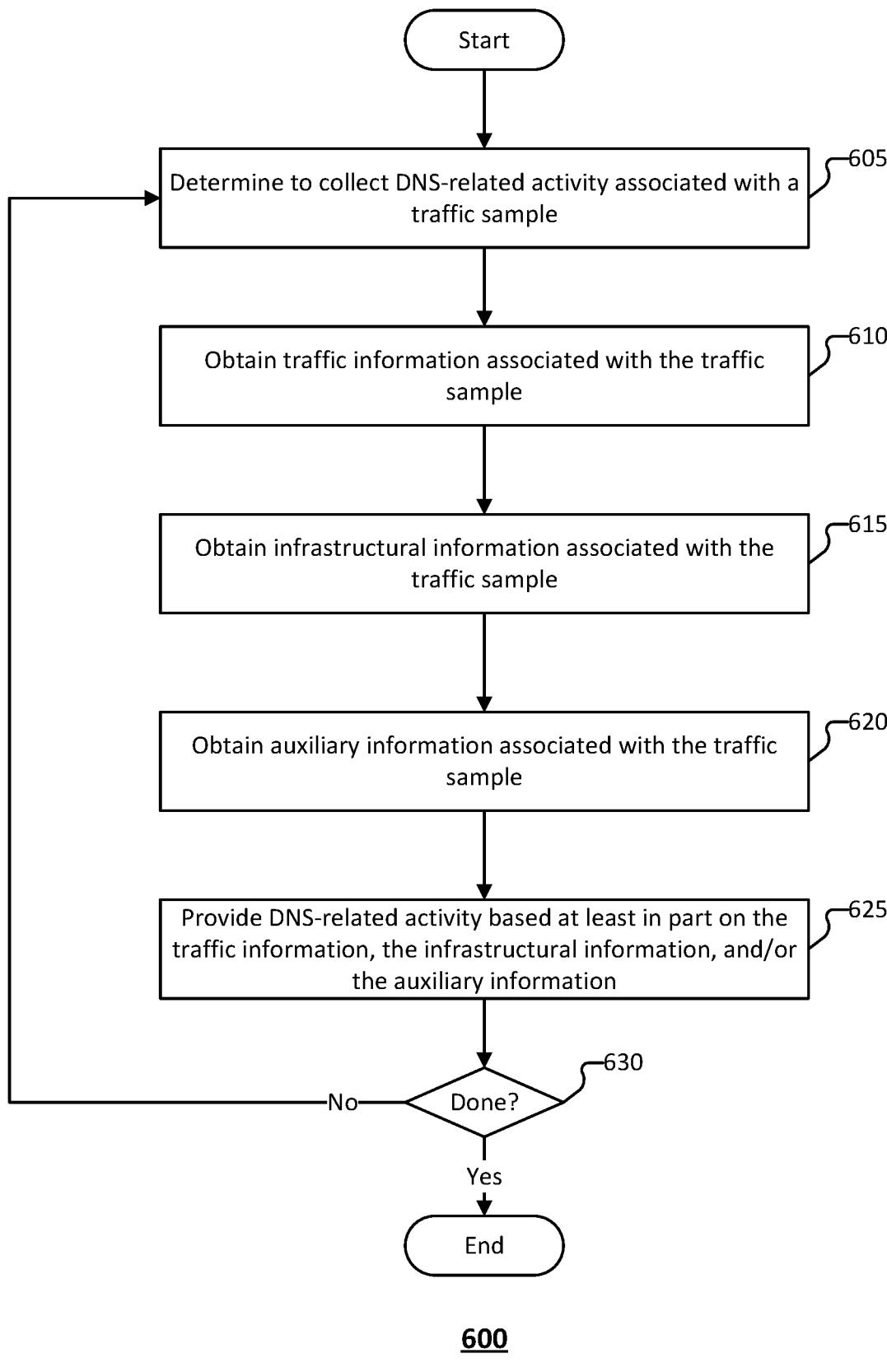
FIG. 6 is a flow diagram of a method for attributing network traffic to a DNS tunneling campaign or tool according to various embodiments.

FIG. 6 is a flow diagram of a method for attributing network traffic to a DNS tunneling campaign or tool according to various embodiments. In some embodiments, process 600 is implemented at least in part on by system 100 of FIG. 1, system 200 of FIG. 2, and/or system 400 of FIG. 4. Process 600 may be invoked by 510 of process 500.

At 605, the system determines to collect DNS-related activity associated with a traffic sample. The system may determine to collect the DNS-related activity associated with a traffic sample based on determining to analyze the traffic sample. For example, 605 may be invoked by 510 of process 500. At 610, the system obtains traffic information associated with the traffic sample. At 615, the system obtains infrastructural information associated with the traffic sample. At 620, the system obtains auxiliary information associated with the traffic sample. At 625, the system provides the DNS-related activity based at least in part on the traffic information, the infrastructural information, and/or the auxiliary information. At 630, a determination is made as to whether process 600 is complete. In some embodiments, process 600 is determined to be complete in response to a determination that no further samples are to be analyzed (e.g., no further predictions for traffic are needed), no further data is to be collected for the traffic sample, no further traffic samples are to be attributed to benign activity or a DNS-tunneling campaigns or tools, an administrator indicates that process 800 is to be paused or stopped, etc. In response to a determination that process 600 is complete, process 600 ends. In response to a determination that process 600 is not complete, process 600 returns to 605.

Figure 7:
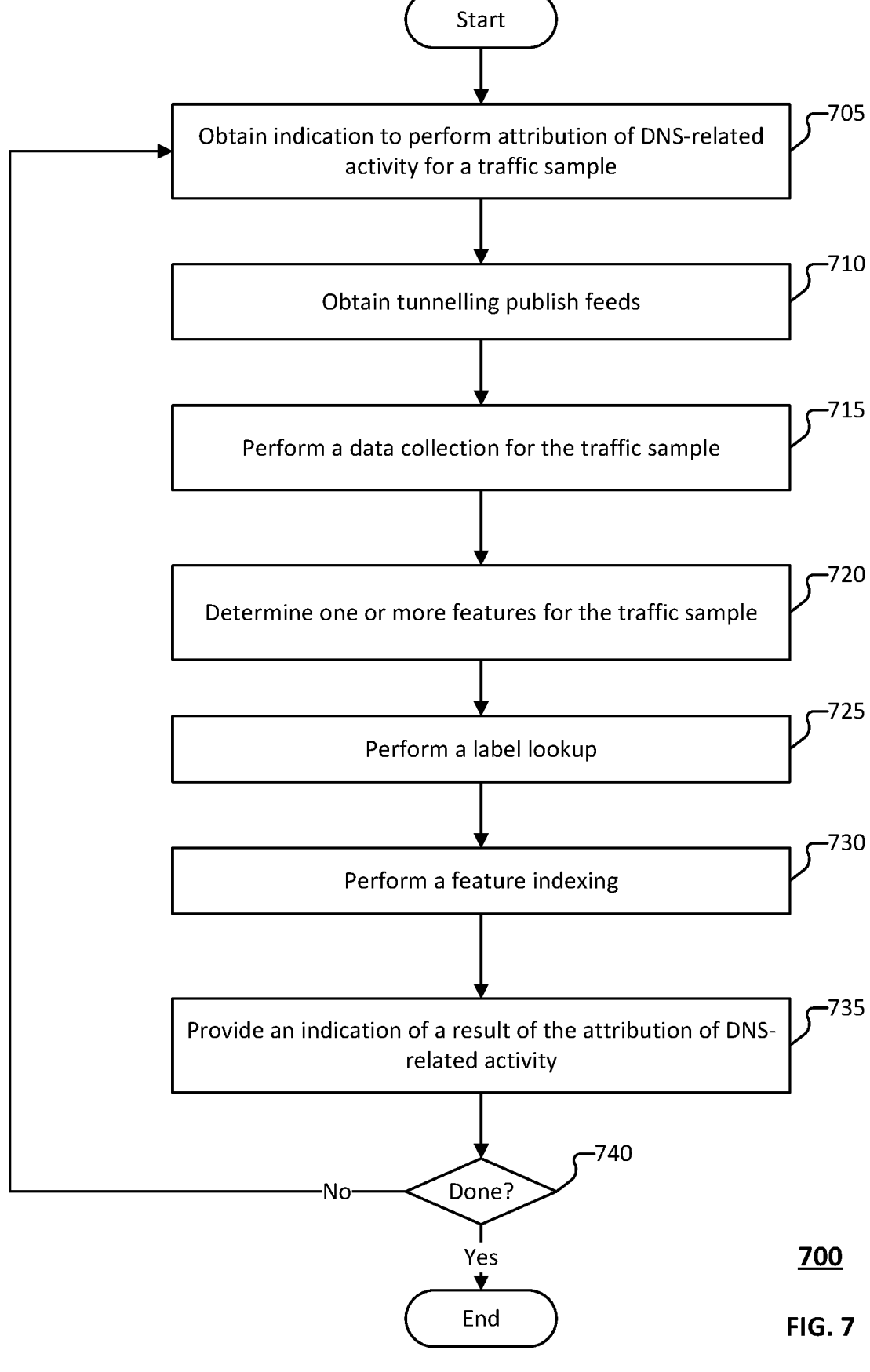
FIG. 7 is a flow diagram of a method for attributing network traffic to a DNS tunneling campaign or tool according to various embodiments.

FIG. 7 is a flow diagram of a method for attributing network traffic to a DNS tunneling campaign or tool according to various embodiments. In some embodiments, process 700 is implemented at least in part on by system 100 of FIG. 1, system 200 of FIG. 2, and/or system 400 of FIG. 4. Process 700 may be invoked by 510 of process 500.

At 705, the system obtains an indication to perform attribution of DNS-related activity for a traffic sample. The system may determine to collect the DNS-related activity associated with a traffic sample based on determining to analyze the traffic sample. For example, 705 may be invoked by 510 of process 500. At 710, the system obtains tunneling publish feeds. At 715, the system performs a data collection for the traffic sample. At 720, the system determines one or more features for the traffic sample. For example, the system determines one or more of lexical features 422, statistical features 424, infrastructural feature 426, and/or auxiliary features 428. At 725, the system performs a label lookup, such as based on the one or more features determined for the traffic sample. The system performs the label lookup with respect to an index of labeled data, such as a mapping of features to known DNS tunneling campaigns or tools. At 730, the system performs a feature indexing. The system stores the computed features in an index, such as a mapping of features to known DNS tunneling campaigns or tools. At 735, the system provides an indication of a result of the attribution of the DNS-related activity. At 740, a determination is made as to whether process 700 is complete. In some embodiments, process 700 is determined to be complete in response to a determination that no further samples are to be analyzed (e.g., no further predictions for traffic are needed), no further traffic samples are to be attributed to benign activity or a DNS-tunneling campaigns or tools, an administrator indicates that process 800 is to be paused or stopped, etc. In response to a determination that process 700 is complete, process 700 ends. In response to a determination that process 700 is not complete, process 700 returns to 705.

Figure 8:
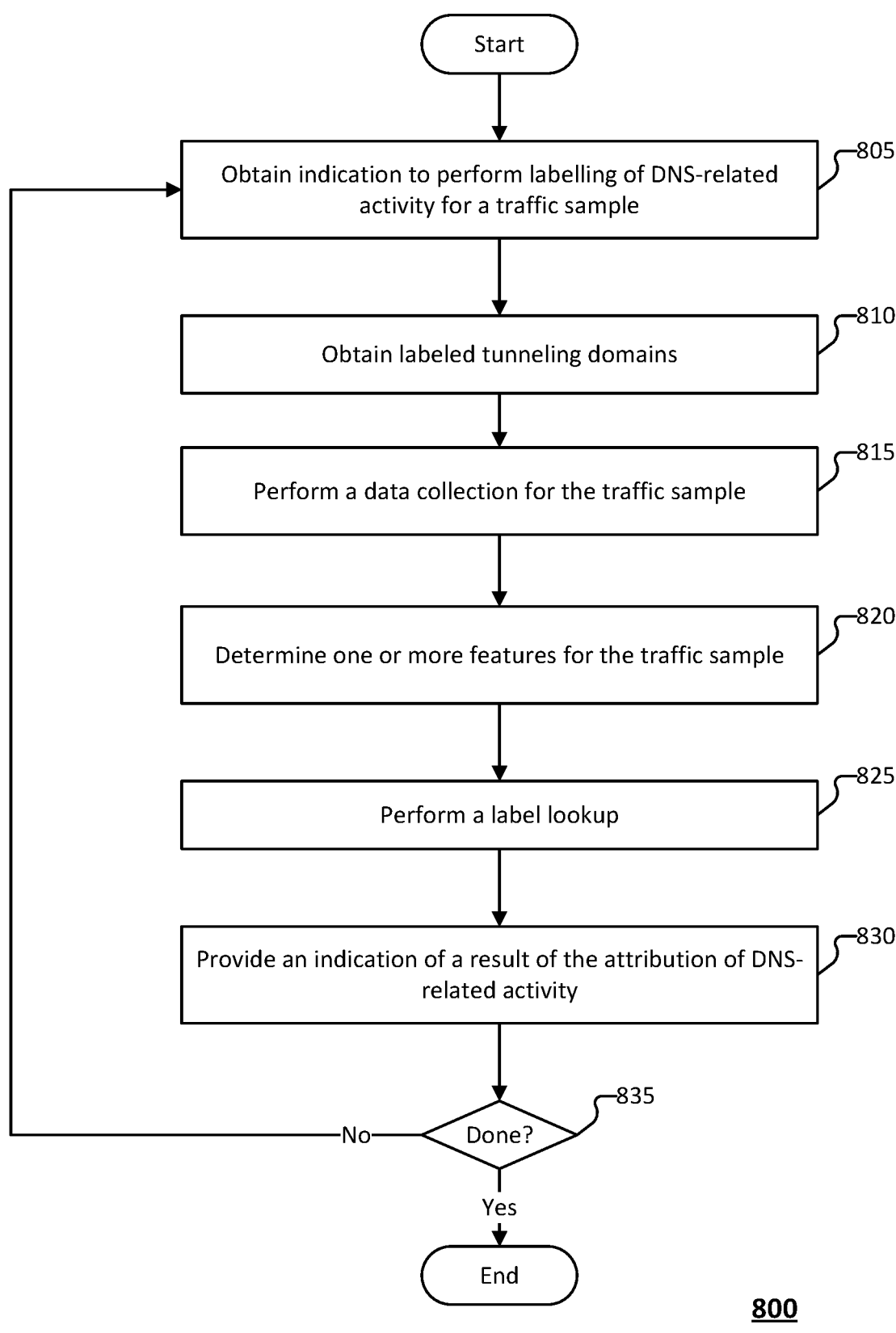
FIG. 8 is a flow diagram of a method for attributing network traffic to a DNS tunneling campaign or tool according to various embodiments.

FIG. 8 is a flow diagram of a method for attributing network traffic to a DNS tunneling campaign or tool according to various embodiments. In some embodiments, process 800 is implemented at least in part on by system 100 of FIG. 1, system 200 of FIG. 2, and/or system 400 of FIG. 4. Process 800 may be invoked by 510 of process 500.

At 805, the system obtains an indication to perform labelling of DNS-related activity for a traffic sample. At 810, the system obtains labeled tunneling domains. At 815, the system performs a data collection for the traffic sample. At 820, the system determines one or more features for the traffic sample. At 825, the system performs a label lookup, such as based on the one or more features determined for the traffic sample. At 830, the system provides an indication of a result of the attribution of DNS-related activity. At 835, a determination is made as to whether process 800 is complete. In some embodiments, process 800 is determined to be complete in response to a determination that no further samples are to be analyzed (e.g., no further predictions for traffic are needed), no further traffic samples are to be attributed to benign activity or a DNS-tunneling campaigns or tools, an administrator indicates that process 800 is to be paused or stopped, etc. In response to a determination that process 800 is complete, process 800 ends. In response to a determination that process 800 is not complete, process 800 returns to 805.

Figure 9:
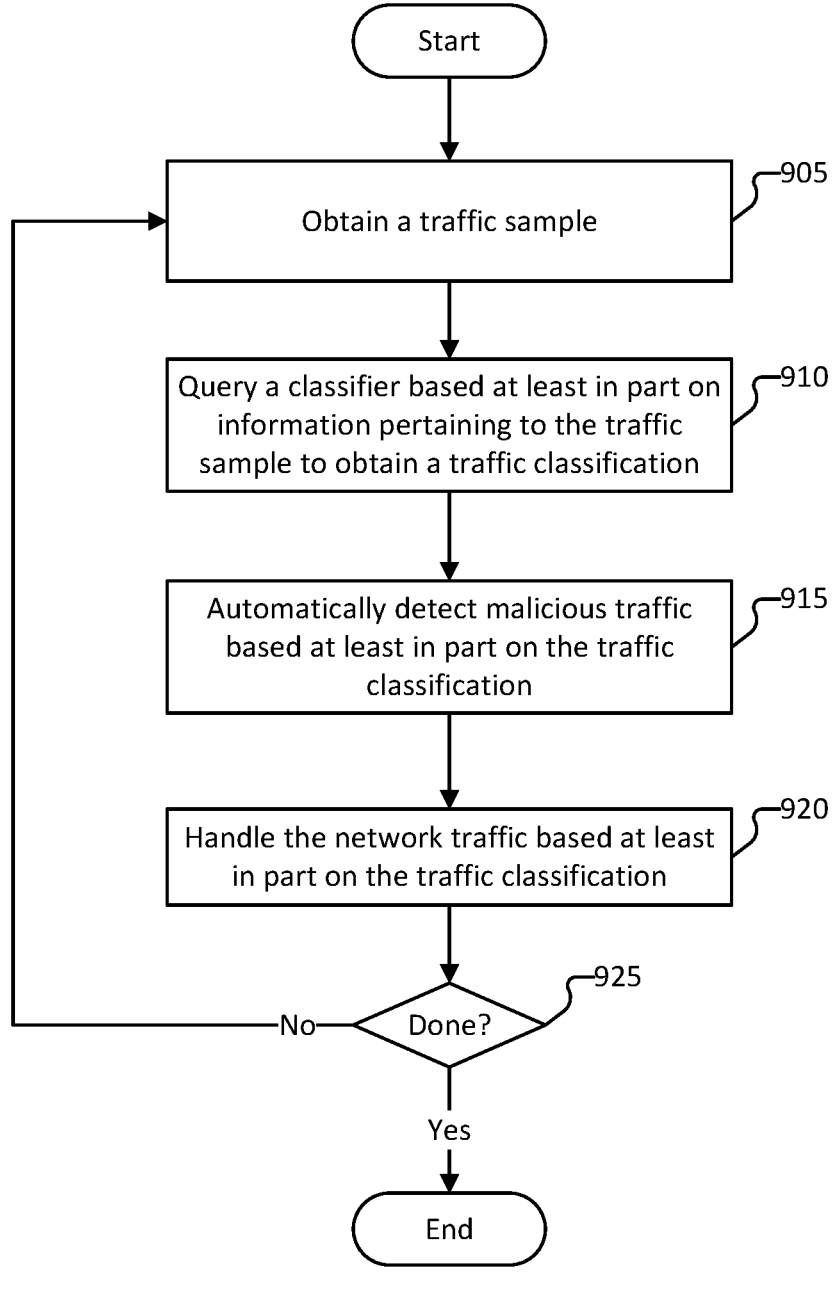
FIG. 9 is a flow diagram of a method for detecting malicious traffic according to various embodiments.

FIG. 9 is a flow diagram of a method for detecting malicious traffic according to various embodiments. In some embodiments, process 900 is implemented at least in part on by system 100 of FIG. 1, system 200 of FIG. 2, and/or system 400 of FIG. 4.

At 905, a traffic sample is obtained. In some embodiments, obtaining the traffic sample includes collecting information pertaining to the traffic sample, such as pertaining to the DNS-activity. The system may collect traffic information, infrastructural information, and/or auxiliary information. The system characterizes the information, such as by computing features or hashes/signatures.

At 910, a classifier is queried based at least in part on the header representation to obtain a traffic classification. In some embodiments, the classifier is a machine learning model. The classifier predicts a classification for the network traffic (e.g., a traffic classification). As an example, the system uses computed features or hashes/signatures for the DNS-activity information for the traffic sample to query the classifier. In some embodiments, the system queries the classifier to obtain a prediction of whether the traffic sample corresponds to malicious traffic or benign traffic, etc. In some embodiments, the system queries the classifier to obtain a prediction of an attribution of the traffic sample to a known DNS tunneling campaign or tool.

At 915, malicious traffic is automatically detected based at least in part on the traffic classification. The system obtains an output/result from the classifier. As an example, in response to obtaining the output/result, the system performs a classification labelling to label the network traffic. As an example, in the event that the output is a likelihood that the traffic is malicious traffic, the classification labelling may include comparing the result to a threshold (e.g., a predefined malicious likelihood threshold) and in response to determining that the result exceeds the threshold, labelling the traffic as malicious traffic, and in response to determining that the result is less than the threshold, labelling the traffic as non-malicious traffic, such as benign traffic.

At 920, the network traffic is handled based at least in part on the traffic classification. In response to determining the traffic classification (e.g., performing the classification labelling), the system handles the network traffic accordingly. For example, if the network traffic is classified as malicious traffic, the system handles the network traffic as malicious traffic. As another example, if the network traffic is classified as benign traffic, the system handles the network traffic as benign. In some embodiments, the system handles the network traffic based at least in part on (i) the traffic classification, and (ii) a security policy. For example, a security policy may define how the system is to handle malicious traffic (e.g., block the traffic, etc.). As another example, if the network traffic is attributed to a particular DNS tunneling campaign or tool, the system handles the network traffic based at least in part on the attribution.

At 925, a determination is made as to whether process 900 is complete. In some embodiments, process 900 is determined to be complete in response to a determination that no further samples are to be analyzed (e.g., no further predictions for traffic are needed), no further traffic samples are to be attributed to benign activity or a DNS-tunneling campaigns or tools, no further traffic is to be handled, an administrator indicates that process 800 is to be paused or stopped, etc. In response to a determination that process 900 is complete, process 900 ends. In response to a determination that process 900 is not complete, process 900 returns to 905.

FIG. 10 is a flow diagram of a method for detecting malicious traffic according to various embodiments. In some embodiments, process 1000 is implemented at least in part by system 100 of FIG. 1, system 200 of FIG. 2, and/or system 400 of FIG. 4. In some implementations, process 1000 may be implemented by one or more servers, such as in connection with providing a service to a network (e.g., a security entity and/or a network endpoint such as a client device). In some implementations, process 1000 may be implemented by a security entity (e.g., a firewall) such as in connection with enforcing a security policy with respect to files communicated across a network or in/out of the network. In some implementations, process 1000 may be implemented by a client device such as a laptop, a smartphone, a personal computer, etc., such as in connection with executing or opening a file such as an email attachment.

At 1005, a sample is received. In some embodiments, the system receives a sample from a security entity (e.g., a firewall), an endpoint (e.g., a client device), etc. For example, in response to receiving network traffic, the security entity or endpoint extracts a traffic sample (e.g., a first packet for an HTTP request, etc.), and the security entity or endpoint provides (e.g., sends) the traffic sample to the system. The sample may be received in connection with a request to determine whether the traffic sample is malicious. For example, the security entity queries the system for a determination of whether the traffic sample is malicious (e.g., for detection of malicious traffic, etc.). As another example, the security entity queries the system for a determination of an attribution of the sample to a particular DNS tunneling campaign or tool.

In the case that process 1000 is implemented by a security entity, the sample may be received such as in connection with routing traffic to an applicable network endpoint (e.g., a firewall obtains the sample as traffic is communicated across the firewall). In the case that process 1000 is implemented by a client device, the sample may be received by an application or layer monitoring incoming/outgoing information. For example, a process (e.g., an application, an operating system process, etc.) may run in the background to monitor and obtain query and/or responses being communicated or transmitted across the network (e.g., across the firewall), etc.

At 1010, the sample is processed to obtain one or more features. For example, the system determines embeddings or features based at least in part on information pertaining to the sample. The system may extract features based on the header for the sample.

At 1015, a malicious traffic detector is applied to analyze the sample. In some embodiments, the malicious traffic detector corresponds to, or is similar to, a machine learning (e.g., a machine learning model), prediction engine module 235, etc. The malicious traffic detector may implement a machine learning process to analyze the sample (e.g., the embeddings for the sample, such as header embeddings) corresponding to the sample. The malicious traffic detector may implement a lookup against an index of label data.

At 1020, a determination of whether the sample is malicious is performed. In some embodiments, the system determines whether the sample is malicious based at least in part on the analysis of the sample using the malicious traffic detector. If the output from the malicious traffic detector is an indication of a likelihood that the sample is malicious traffic (e.g., C2 traffic), the system compares the likelihood to a predefined maliciousness likelihood threshold (e.g., a C2 likelihood threshold) to determine whether the sample is classified as malicious traffic (e.g., C2 traffic).

In some embodiments, in response to malicious traffic detector determining that the sample is malicious, or in response to a likelihood generated by malicious traffic detector that the sample is malicious exceeding a predefined likelihood threshold, the system deems sample to be malicious.

In response to a determination that the sample is malicious at 1020, process 1000 proceeds to 1025 at which an indication that the sample is malicious is provided. For example, the indication that the sample is malicious may be provided to the component from which the sample is received. As an example, the system provides the indication that the sample is malicious to a security entity. As another example, the system provides the indication that the sample is malicious to a client device. In some embodiments, the indication that the sample is malicious is provided to a user such as a user of a client device and/or a network administrator.

According to various embodiments, in response to receiving the indication that the sample is malicious, an active measure may be performed. The active measure may be performed in accordance (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the a device attempts to open or execute the file, blocking transmission of the file, updating a blacklist of malicious files (e.g., a mapping of a hash for the traffic sample, such as a hash of the normalized header information, to an indication that the traffic sample is malicious), etc.

In response to a determination that the sample is not malicious at 1020, process 1000 proceeds to 1030. In some embodiments, in response to determining that the sample is not malicious, a mapping of samples (or hashes/signatures of header information, such as hashes for HTTP request headers) to an indication that the sample is not malicious is updated. For example, a whitelist of benign samples is updated to include the sample, or hash, signature, or other unique identifier associated with the sample.

At 1030, a determination is made as to whether process 1000 is complete. In some embodiments, process 1000 is determined to be complete in response to a determination that no further samples are to be analyzed (e.g., no further predictions for traffic are needed), an administrator indicates that process 1000 is to be paused or stopped, etc. In response to a determination that process 1000 is complete, process 1000 ends. In response to a determination that process 1000 is not complete, process 1000 returns to 1105.

FIG. 11 is a flow diagram of a method for handling traffic according to various embodiments. In some embodiments, process 1100 is implemented at least in part on by system 100 of FIG. 1, system 200 of FIG. 2, and/or system 400 of FIG. 4. In some implementations, process 1100 may be implemented by one or more servers, such as in connection with providing a service to a network (e.g., a security entity and/or a network endpoint such as a client device). In some implementations, process 1100 may be implemented by a security entity (e.g., a firewall) such as in connection with enforcing a security policy with respect to files communicated across a network or in/out of the network. In some implementations, process 1100 may be implemented by a client device such as a laptop, a smartphone, a personal computer, etc., such as in connection with executing or opening a file such as an email attachment, or sending HTTP requests across a network.

At 1105, an indication that the sample is malicious is received. In some embodiments, the system receives an indication that a sample is malicious, and the sample or hash, signature, or other unique identifier associated with the sample. For example, the system may receive the indication that the sample is malicious from a service such as a security or malware service. The system may receive the indication that the sample is malicious from one or more servers, such as a cloud service that provides near real-time traffic detection (e.g., a detection latency from the cloud service may be on the order of 10-50 ms).

According to various embodiments, the indication that the sample is malicious is received in connection with an update to a set of previously identified malicious samples (e.g., headers or normalized headers for HTTP requests). For example, the system receives the indication that the sample is malicious as an update to a blacklist of malicious samples.

At 1110, an association of the sample with an indication that the sample is malicious is stored. In response to receiving the indication that the sample is malicious, the system stores the indication that the sample is malicious in association with the sample or an identifier corresponding to the sample to facilitate a lookup (e.g., a local lookup) of whether subsequently received traffic is malicious. In some embodiments, the identifier corresponding to the sample stored in association with the indication that the sample is malicious comprises a hash of the header (or part of the header or normalized header), a signature of the header (or part of the header or normalized header), an IP address associated with the device from which the HTTP request originated, or another unique identifier associated with the header or normalized header.

At 1115, traffic is received. The system may obtain traffic such as in connection with routing traffic within/across a network, or mediating traffic into/out of a network such as a firewall, or a monitoring of email traffic or instant message traffic.

At 1120, a determination of whether the traffic includes a malicious traffic is performed. For example, the system detects whether the traffic is C2 traffic. In some embodiments, the system obtains the traffic sample (e.g., an HTTP request or header for the HTTP request) from the received traffic. In response to obtaining the traffic sample from the traffic, the system determines whether the traffic sample corresponds to a sample comprised in a set of previously identified malicious samples such as a blacklist of malicious samples (e.g., a blacklist of headers for HTTP requests, etc.). In response to determining that the traffic sample is comprised in the set of samples on the blacklist of malicious samples, the system determines that the sample is malicious.

In some embodiments, the system determines whether the traffic sample corresponds to a sample comprised in a set of previously identified benign samples such as a whitelist of benign samples. In response to determining that the sample is comprised in the set of samples on the whitelist of benign samples, the system determines that the sample is not malicious.

According to various embodiments, in response to determining the traffic sample is not comprised in a set of previously identified malicious samples, the system determines to classify the sample based on a different analysis. For example, the system queries a classifier (e.g., machine learning model) as described according to various embodiments to determine whether the sample is malicious (e.g., that the sample corresponds to C2 traffic).

According to various embodiments, in response to determining the traffic sample is not comprised in a set of previously identified malicious samples (e.g., a blacklist of malicious samples) or a set of previously identified benign samples (e.g., a whitelist of benign files), the system deems the traffic sample as being non-malicious (e.g., benign).

According to various embodiments, in response to determining the traffic sample is not comprised in a set of previously identified malicious samples (e.g., a blacklist of malicious samples) or a set of previously identified benign samples (e.g., a whitelist of benign samples), the system queries a malicious traffic detector to determine whether the traffic is malicious (e.g., to perform automatic C2 traffic detection). For example, the system may quarantine the traffic until the system receives response from the malicious traffic detector as to whether the traffic sample is malicious. The malicious traffic detector may perform an assessment of whether the traffic sample is malicious contemporaneous with the handling of the traffic by the system (e.g., in real-time with the query from the system). The malicious traffic detector may correspond to network traffic classifier 170 of system 100 of FIG. 1 and/or system 200 of FIG. 2.

In some embodiments, the system determines whether the traffic sample is comprised in the set of previously identified malicious samples or the set of previously identified benign samples by computing a hash or determining a signature or other unique identifier associated with the sample (e.g., an IP address for the device from which the HTTP request originated), and performing a lookup in the set of previously identified malicious samples or the set of previously identified benign samples for a sample (e.g., an HTTP request) matching the hash, signature or other unique identifier. Various hashing techniques may be implemented.

In response to a determination that the traffic is not malicious traffic at 1120, process 1100 proceeds to 1130 at which the traffic is handled as non-malicious traffic/information.

In response to a determination that the traffic sample is malicious at 1120, process 1100 proceeds to 1125 at which the traffic is handled as malicious traffic/information. The system may handle the malicious traffic/information based at least in part on one or more policies such as one or more security policies.

According to various embodiments, the handling of the malicious traffic/information may include performing an active measure. The active measure may be performed in accordance (e.g., based at least in part on) one or more security policies. As an example, the one or more security policies may be preset by a network administrator, a customer (e.g., an organization/company) to a service that provides detection of malicious traffic, etc. Examples of active measures that may be performed include: isolating the traffic (e.g., quarantining the traffic), deleting the traffic, prompting the user to alert the user that a malicious traffic was detected, blocking transmission of the traffic, updating a blacklist of malicious samples (e.g., a mapping of a hash for the traffic sample to an indication that the traffic sample is malicious, etc.).

At 1135, a determination is made as to whether process 1100 is complete. In some embodiments, process 1100 is determined to be complete in response to a determination that no further samples are to be analyzed (e.g., no further predictions for traffic are needed), no further traffic is to be handled, an administrator indicates that process 1100 is to be paused or stopped, etc. In response to a determination that process 1100 is complete, process 1100 ends. In response to a determination that process 1100 is not complete, process 1100 returns to 1105.

FIG. 12 is a flow diagram of a method for detecting malicious traffic according to various embodiments. In some embodiments, process 1200 is implemented at least in part by system 100 of FIG. 1, system 200 of FIG. 2, and/or system 400 of FIG. 4. In some implementations, process 1200 may be implemented by a security entity (e.g., a firewall) such as in connection with enforcing a security policy with respect to traffic communicated across a network or in/out of the network, and/or an anti-malware application running on a client system, etc. In some implementations, process 1200 may be implemented by a client device such as a laptop, a smartphone, a personal computer, etc.

At 1205 a traffic sample is obtained from traffic. The system may obtain traffic such as in connection with routing traffic within/across a network, or mediating traffic into/out of a network such as a firewall, or a monitoring of email traffic or instant message traffic. In some embodiments, the system obtains the traffic sample from the received traffic.

At 1210, a signature corresponding to the traffic sample is determined. In some embodiments, the system computes a hash or determines a signature or other unique identifier associated with the traffic sample, such as based on the header information comprised in the traffic sample (e.g., a normalized header for an HTTP request). Various hashing techniques may be implemented. For example, the hashing technique may be the determining (e.g., computing) the MD5 hash for the header/header information comprised in the traffic sample (e.g., the HTTP request). As another example, the system computes a hash or signature with respect to DNS-activity information for the traffic sample.

At 1215, a dataset for signatures of malicious samples is queried to determine whether the signature corresponding to the traffic sample matches a signature from a malicious sample. In some embodiments, the system performs a lookup in the dataset for signatures of malicious samples for a file matching the hash, signature or other unique identifier. The dataset for signatures of malicious samples may be stored locally at the system or remotely on a storage system that is accessible to the system.

At 1220, a determination of whether the traffic sample is malicious is made based at least in part on whether a signature for the traffic sample matches a signature for a malicious sample. In some embodiments, the system determines whether the dataset of malicious signature comprises a record matching the signature for the traffic sample obtained from traffic. In response to determining that the historical dataset indicates that a hash for the traffic sample is comprised in the dataset for signatures of malicious samples (e.g., the hash of the traffic sample is included in a blacklist of samples), the system deems the traffic sample obtained from the traffic at 1005 to be malicious. In some embodiments, in response to determining that the signature does not match a signature for a malicious sample (e.g., in a mapping of signatures to malicious samples/exploits), the system determines to classify the sample based on querying a classifier (e.g., a machine learning model that detects C2 traffic, etc.).

At 1225, the traffic is handled according to whether the traffic sample is malicious. In some embodiments, in response to determining that the traffic sample is malicious, the system applies one or more security policies with respect to the traffic. In some embodiments, in response to determining that the traffic sample is not malicious, the system handles the traffic as being benign (e.g., the traffic is handled as normal traffic).

At 1230, a determination is made as to whether process 1200 is complete. In some embodiments, process 1200 is determined to be complete in response to a determination that no further samples or traffic are to be analyzed (e.g., no further predictions for traffic are needed), no further traffic is to be handled, an administrator indicates that process 1200 is to be paused or stopped, etc. In response to a determination that process 1200 is complete, process 1200 ends. In response to a determination that process 1200 is not complete, process 1200 returns to 1205.

FIG. 13 is a flow diagram of a method for training a model according to various embodiments. In some embodiments, process 1300 is implemented at least in part by system 100 of FIG. 1, system 200 of FIG. 2, and/or system 400 of FIG. 4.

At 1305, information pertaining to a set of historical malicious samples is obtained. In some embodiments, the system obtains the information pertaining to a set of historical malicious samples from a third-party service (e.g., VirusTotal™). The system may collect sample network traffic, including malicious traffic such as C2 traffic. The sample network traffic may include traffic obtained while monitoring traffic across an organization's network and/or traffic that is probabilistically generated (e.g., using random seeds obtained from an LLM, etc.). As an example, the system collects multiple types of C2 traffic, including Cobalt Strike, Empire, Covenant, etc. At 1310, information pertaining to a set of historical benign samples is obtained. In some embodiments, the system obtains the information pertaining to a set of historical benign samples from a third-party service (e.g., VirusTotal™). The system collects benign traffic, such as based on samples for which malicious traffic detection was previously performed (e.g., using one or more machine learning models, etc.). At 1315, a model is trained for determining whether a sample is malicious (e.g., whether a traffic sample is C2 traffic). Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DB-SCAN) clustering, principal component analysis, etc. At 1320, the model is deployed. In some embodiments, the deploying of the model includes storing the model in a dataset of models for use in connection with analyzing traffic to determine whether the traffic is malicious. The deploying the model can include providing the model (or a location at which the model can be invoked) to a malicious traffic detector, such as network traffic classifier 170 of system 100 of FIG. 1, or to system 200 of FIG. 2. At 1330, a determination is made as to whether process 1300 is complete. In some embodiments, process 1300 is determined to be complete in response to a determination that no further models are to be determined/trained (e.g., no further classification models are to be created), no further models are to be retrained, no further sample C2 traffic is to be generated, an administrator indicates that process 1300 is to be paused or stopped, etc. In response to a determination that process 1300 is complete, process 1300 ends. In response to a determination that process 1300 is not complete, process 1300 returns to 1305.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for classifying DNS tunneling traffic, comprising:
   one or more processors configured to:
      collect DNS-related activity;
      determine whether the DNS-related activity is associated with a DNS tunneling campaign or tool, wherein determining whether the DNS-related activity is associated with a DNS tunneling campaign or tool comprises:
         aggregating domain-level data from a plurality of heterogeneous data sources to generate multi-source features for the DNS-related activity, wherein the plurality of heterogeneous data sources include two or more of passive DNS repositories, certificate transparency logs, and third-party threat intelligence feeds; and
      handle network traffic based at least in part on (i) detecting DNS traffic associated with a tunneling domain, and (ii) a predefined security policy; and
   a memory coupled to the one or more processors and configured to provide the one or more processors with instructions.

2. The system of claim 1, wherein the DNS-related activity collected comprises one or more of query and response information, passive DNS information, DNS structural information, and auxiliary information.

3. The system of claim 2, wherein the DNS structural information comprises one or more of whois data, certificates, active DNS data, and web sites.

4. The system of claim 2, wherein the auxiliary information comprises one or more of customer information, third-party threat assessment information, information obtained from security entities that monitor network traffic for one or more organizations, and incident of compromise (IoC) feeds.

5. The system of claim 1, wherein the DNS-related activity is determined in real-time with receiving network traffic associated with the collected DNS-related activity.

6. The system of claim 1, wherein determining whether the DNS-related activity is associated with the DNS tunneling campaign or tool includes attributing the DNS-related to a particular campaign or tool.

7. The system of claim 1, wherein an incident response is deployed based on a determination of an attribution of a campaign or tool associated with the DNS-related activity.

8. The system of claim 1, wherein determining whether the DNS-related activity is associated with a DNS tunneling campaign or tool comprises determining one or more features, and attributing the DNS-related activity to a particular campaign or tool based at least in part on the one or more features.

9. The system of claim 8, wherein the one or more features includes one or more of a lexical feature, a statistical feature, an infrastructural features, and an auxiliary feature.

10. The system of claim 1, wherein determining whether the DNS-related activity is associated with a DNS tunneling campaign or tool comprises:
    performing a lookup process to match unknown tunneling domains against known domains.

11. The system of claim 10, wherein the lookup process includes performing a Term Frequency-Inverse Document Frequency (TF-IDF) scoring.

12. The system of claim 10, wherein a particular campaign or tool to which the DNS-related activity corresponds is determined based at least in part on results from the lookup process.

13. The system of claim 1, wherein determining whether the DNS-related activity is associated with a DNS tunneling campaign or tool comprises:
    in response to determining the campaign or tool attribution for the DNS-related activity, storing information pertaining to the DNS-related activity to an index for subsequent DNS tunneling detections.

14. The system of claim 13, wherein the information pertaining to the DNS-related activity stored in the index includes one or more features that are determined based at least in part on domain information associated with the DNS-related activity.

15. The system of claim 1, wherein determining whether the DNS-related activity is associated with a DNS tunneling campaign or tool comprises:
    determining whether the DNS-related activity is a Cobalt strike campaign or generated using a Pupy tool.

16. The system of claim 1, wherein the one or more processors are further configured to:
    determine one or more features associated with network traffic;
    perform a clustering on the one or more features; and
    detect new DNS-tunneling campaigns or tools based at least in part on results of the clustering of the one or more features.

17. The system of claim 16, wherein performing a cluster on the one or more features comprises implementing a machine learning process to detect new clusters corresponding to previously unknown DNS-tunneling campaigns or tools.

18. The system of claim 1, wherein the network traffic is handled according to a security policy.

19. The system of claim 1, wherein handling the network traffic according to the security policy comprises performing an active measure in response to detecting DNS traffic associated with a tunneling domain.

20. The system of claim 19, wherein the active measure includes one or more of: blocking, providing an alert to a user or other system, logging a determination of whether the DNS-related activity is associated with the DNS tunneling campaign or tool, quarantine network traffic corresponding to the DNS-related activity, and adding the network traffic corresponding to the DNS-related activity to a block list.

21. A method for classifying DNS tunneling traffic, comprising:

collecting DNS-related activity; and determining whether the DNS-related activity is associated with a DNS tunneling campaign or tool, wherein determining whether the DNS-related activity is associated with a DNS tunneling campaign or tool comprises:

aggregating domain-level data from a plurality of heterogeneous data sources to generate multi-source features for the DNS-related activity, wherein the plurality of heterogeneous data sources include two or more of passive DNS repositories, certificate transparency logs, and third-party threat intelligence feeds; and performing an active measure in response to detecting DNS traffic associated with a tunneling domain, wherein the active measure is determined based at least in part on a predefined security policy.

22. A computer program product embodied in a non-transitory computer readable medium for classifying DNS tunneling traffic, and the computer program product comprising computer instructions for:

collecting DNS-related activity; and determining whether the DNS-related activity is associated with a DNS tunneling campaign or tool, wherein determining whether the DNS-related activity is associated with a DNS tunneling campaign or tool comprises:

aggregating domain-level data from a plurality of heterogeneous data sources to generate multi-source features for the DNS-related activity, wherein the plurality of heterogeneous data sources include two or more of passive DNS repositories, certificate transparency logs, and third-party threat intelligence feeds; and performing an active measure in response to detecting DNS traffic associated with a tunneling domain, wherein the active measure is determined based at least in part on a predefined security policy.

23. The system of claim 1, wherein the one or more processors are configured to cluster unlabeled DNS-related activity using unsupervised learning to identify new potential tunneling campaigns or tools based on deviations from previously indexed feature distributions.

24. The system of claim 1, wherein determine whether the DNS-related activity is associated with a DNS tunneling campaign or tool comprises:

attributing the DNS-related activity to a particular campaign.

* * * * *